(12) United States Patent
Harada et al.

(10) Patent No.: US 10,181,202 B2
(45) Date of Patent: Jan. 15, 2019

(54) CONTROL APPARATUS, ROBOT, AND CONTROL METHOD

(71) Applicant: Seiko Epson Corporation, Tokyo (JP)

(72) Inventors: Tomoki Harada, Matsumoto (JP); Koichi Hashimoto, Sendai (JP); Shogo Arai, Sendai (JP); Toshiki Boshu, Sendai (JP)

(73) Assignee: Seiko Epson Corporation (JP)

( * ) Notice: Subject to any disclaimer, the term of this patent is extended or adjusted under 35 U.S.C. 154(b) by 346 days.

(21) Appl. No.: 14/719,870

(22) Filed: May 22, 2015

(65) Prior Publication Data

US 2015/0339833 A1   Nov. 26, 2015

(30) Foreign Application Priority Data

May 23, 2014   (JP) ................... 2014-107053

(51) Int. Cl.
| | |
|---|---|
| *G06T 7/60* | (2017.01) |
| *H04N 13/275* | (2018.01) |
| *G01B 11/25* | (2006.01) |
| *G06T 7/593* | (2017.01) |
| *H04N 13/02* | (2006.01) |

(52) U.S. Cl.
CPC .......... *G06T 7/602* (2013.01); *G01B 11/2545* (2013.01); *G06T 7/593* (2017.01); *H04N 13/275* (2018.05); *G06T 2207/10012* (2013.01); *G06T 2207/10028* (2013.01); *G06T 2207/20021* (2013.01)

(58) Field of Classification Search
CPC .............. G06T 7/602; G06T 7/593; G06T 2207/20021; G06T 2207/10012; G06T 2207/10028; G01B 11/2545; H04N 13/0275
See application file for complete search history.

(56) References Cited

U.S. PATENT DOCUMENTS

| | | | | |
|---|---|---|---|---|
| 8,786,682 B2 * | 7/2014 | Shpunt | ............... | G01B 11/2518 348/50 |
| 2011/0150356 A1 * | 6/2011 | Jo | ........................ | G06T 5/002 382/269 |
| 2011/0221891 A1 * | 9/2011 | Sonoda | ............... | G01B 11/2513 348/135 |
| 2012/0089364 A1 * | 4/2012 | Takabayashi | .......... | G01B 11/25 702/167 |
| 2012/0236317 A1 * | 9/2012 | Nomura | ............... | G01B 11/026 356/610 |

(Continued)

FOREIGN PATENT DOCUMENTS

| | | |
|---|---|---|
| JP | 10-038559 A | 2/1998 |
| JP | 2000-283751 A | 10/2000 |
| JP | 2012-103239 A | 5/2012 |

*Primary Examiner* — Sathyanaraya V Perungavoor
*Assistant Examiner* — Howard D Brown, Jr.
(74) *Attorney, Agent, or Firm* — Harness, Dickey & Pierce, P.L.C.

(57) ABSTRACT

A control apparatus includes a projection unit configured to project a first pattern onto an object; and a selection unit configured to select a single first pattern from a plurality of first patterns. After the projection unit projects each of the plurality of first patterns having different resolutions onto the object, the projection unit projects a second pattern onto the object, the second pattern having the same resolution as that of the selected single first pattern.

10 Claims, 20 Drawing Sheets

(56) References Cited

U.S. PATENT DOCUMENTS

| | | | |
|---|---|---|---|
| 2013/0321582 A1* | 12/2013 | Huang | G01B 11/303 |
| | | | 348/46 |
| 2014/0063204 A1* | 3/2014 | Siercks | G01B 11/2545 |
| | | | 348/50 |
| 2014/0071459 A1* | 3/2014 | Nakatsukasa | G01B 11/25 |
| | | | 356/611 |

* cited by examiner

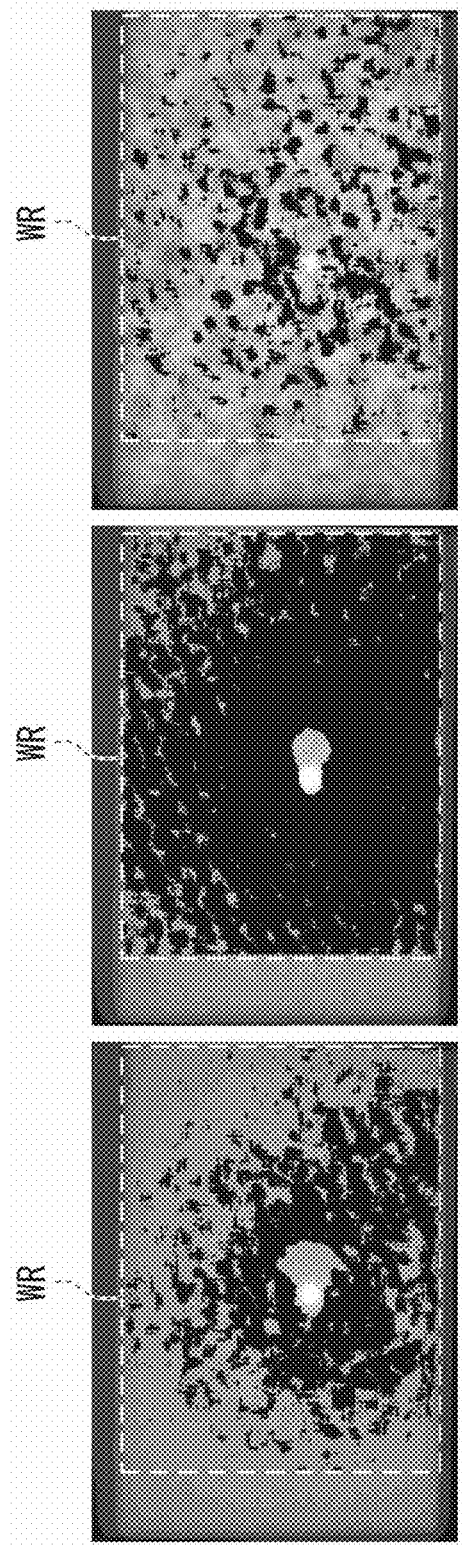
FIG. 2C
FIG. 2B
FIG. 2A
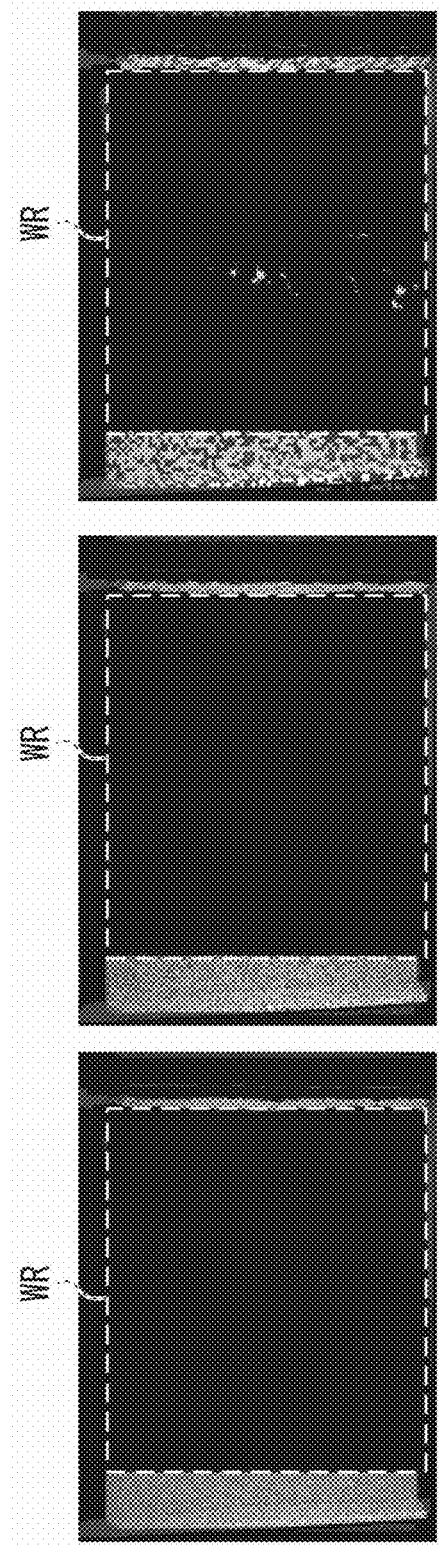
FIG. 2F
FIG. 2E
FIG. 2D

CONTROL APPARATUS, ROBOT, AND CONTROL METHOD

BACKGROUND

1. Technical Field

The present invention relates to a control apparatus, a robot, and a control method.

2. Related Art

There has been research and development regarding a technology of capturing a measurement target onto which a pattern image is projected by a projection unit, and performing various processes (for example, the generation of a three-dimensional point cloud) using a three-dimensional measurement of the measurement target based on the captured image.

In this regard, a three-dimensional measurement apparatus configured to appropriately determine the boundary between a bright section and a dark section using a space encoding method when reflected light is blurred is known (refer to JP-A-2012-103239).

More specifically, the three-dimensional measurement apparatus controls a projector to project plural rays of stripe pattern light having alternately positioned bright and dark regions with different widths onto an object, controls a camera to capture an image of light reflected from the object onto which the plural rays of stripe pattern light are projected, acquires information related to the distance from the object corresponding to each of the plural rays of stripe pattern light, and calculates the reliability of each of the plural rays of stripe pattern light.

During the calculation, the projector projects stripe pattern light onto the object, the stripe pattern light being shifted by a predetermined cycle from the stripe pattern light having the calculated reliability greater than or equal to a threshold value. In addition, the camera captures an image of reflected light of the stripe pattern light shifted by the predetermined cycle. The three-dimensional measurement apparatus acquires information related to the distance from the object corresponding to the stripe pattern light shifted by the predetermined cycle.

However, an apparatus in the related art cannot measure the three dimensions of a measurement target based on a pattern image, depending on the material or the shape of the measurement target. In particular, bleeding of the pattern image projected onto the measurement target may occur in a captured image depending on the material or the shape of the measurement target to be measured three-dimensionally, and it is necessary to find a pattern image suitable for the material or the shape of the measurement target via a trial and error method whenever the material or the shape of the measurement target is changed.

SUMMARY

An advantage of some aspects of the invention is to provide a control apparatus, a robot, and a control method which can perform a three-dimensional measurement suitable for the material or the shape of a measurement target.

An aspect of the invention is directed to a control apparatus including: a projection unit configured to project a first pattern onto an object; and a selection unit configured to select a single first pattern from a plurality of first patterns. After the projection unit projects each of the plurality of first patterns having different resolutions onto the object, the projection unit projects a second pattern onto the object, the second pattern having the same resolution as that of the selected single first pattern.

With this configuration, the control apparatus projects each of the plurality of first patterns having the different resolutions onto the object, selects a single first pattern from the plurality of first patterns, and projects the second pattern onto the object, the second pattern having the same resolution as that of the selected single first pattern. Accordingly, the control apparatus can perform a three-dimensional measurement suitable for the material or the shape of a measurement target.

In another aspect of the invention, the control apparatus may be configured to further include a calculation unit configured to calculate a statistic for each of the first patterns based on a plurality of captured images that capture the object onto which each of the plurality of first patterns having the different resolutions is projected. The selection unit may be configured to select the single first pattern based on the calculated statistic for each of the first patterns.

With this configuration, the control apparatus calculates the statistic for each of the first patterns based on the plurality of captured images that capture the object onto which each of the plurality of first patterns having the different resolutions is projected, and selects the single first pattern based on the calculated statistic for each of the first patterns. Accordingly, the control apparatus can select the second pattern suitable for the material or the shape of a measurement target based on the resolution of the first pattern selected based on the statistic for each of the first patterns, and measure the object three-dimensionally based on the second pattern.

In another aspect of the invention, in the control apparatus, the calculation unit may be configured to calculate the statistic for the entire region indicative of the object in the captured image.

With this configuration, the control apparatus calculates the statistic for the entire region indicative of the object in the plurality of captured images that capture the object onto which each of the plurality of first patterns having the different resolutions is projected. Accordingly, the control apparatus can perform a three-dimensional measurement suitable for the material or the shape of the entirety of the object.

In another aspect of the invention, in the control apparatus, the calculation unit may be configured to divide a region indicative of the object in the captured image into a plurality of regions, and to calculate a statistic for each of the divided regions. The selection unit may be configured to select the single first pattern while considering the calculated statistic for each of the divided regions as the statistic for each of the first patterns.

With this configuration, the control apparatus divides the region indicative of the object in the plurality of captured images into the plurality of regions, the plurality of captured images capturing the object onto which each of the plurality of first patterns having the different resolutions is projected, calculates the statistic for each of the divided regions, and selects the single first pattern while considering the calculated statistic for each of the divided regions as the statistic for each of the first patterns. Accordingly, the control apparatus can perform a three-dimensional measurement suitable for the material or the shape of the entirety of the object, based on the calculated statistic for each of the partial regions on the object.

In another aspect of the invention, in the control apparatus, the calculation unit may be configured to divide a region indicative of the object in the captured image into a plurality of regions, and to calculate a statistic for each of the divided regions. The selection unit may be configured to select the single first pattern for each of the regions based on the calculated statistic for each of the divided regions.

With this configuration, the control apparatus divides the region indicative of the object in the plurality of captured images into the plurality of regions, the plurality of captured images capturing the object onto which each of the plurality of first patterns having the different resolutions is projected, to calculate the statistic for each of the divided regions, and selects the single first pattern for each of the regions based on the calculated statistic for each of the divided regions. Accordingly, the control apparatus can perform a three-dimensional measurement suitable for the material or the shape of each partial region on the object.

In another aspect of the invention, in the control apparatus, the selection unit may be configured to select the single first pattern, which satisfies a predetermined condition, from the first patterns whose statistics are a predetermined value or greater.

With this configuration, the control apparatus selects the single first pattern, which satisfies the predetermined condition, from the first patterns whose statistics are the predetermined value or greater. Accordingly, the control apparatus can perform a three-dimensional measurement suitable for the material or the shape of the object, based on the first pattern, which satisfies the predetermined condition and is selected from the first patterns whose statistics are the predetermined value or greater.

In another aspect of the invention, in the control apparatus, the predetermined condition may be a configuration that the first pattern having the smallest resolution is selected from the first patterns whose statistics are the predetermined value or greater.

With this configuration, the control apparatus selects the single first pattern having the smallest resolution from the first patterns whose statistics are the predetermined value or greater. Accordingly, the control apparatus can perform a high-resolution three-dimensional measurement.

In another aspect of the invention, in the control apparatus, the first pattern may be a grid pattern depicted by a first color and a second color different from the first color, and the calculation unit may calculate a dispersion for a distribution of the first color and the second color as the statistic.

With this configuration, the control apparatus projects each of the plurality of grid patterns having the different resolutions onto the object, selects a single grid pattern from the plurality of grid patterns, and projects the second pattern onto the object based on the resolution of the selected single grid pattern. Accordingly, the control apparatus can perform a three-dimensional measurement using the second pattern suitable for the material or the shape of the object based on the grid pattern.

In another aspect of the invention, in the control apparatus, one of the first color and the second color may be a white color, and the other may be a black color.

With this configuration, the control apparatus projects each of the plurality of white and black grid patterns having the different resolutions onto the object, selects a single grid pattern from the plurality of grid patterns, and projects the second pattern onto the object based on the resolution of the selected single grid pattern. Accordingly, the control apparatus can perform a three-dimensional measurement using the second pattern suitable for the material or the shape of the object based on the white and black grid patterns.

In another aspect of the invention, in the control apparatus, the second pattern may be one of the first patterns, or one of patterns different from the first pattern.

With this configuration, the control apparatus projects each of the plurality of first patterns having different resolutions onto the object, selects a single first pattern from the plurality of first patterns, and projects one of the first patterns based on the resolution of the selected first pattern or one of the patterns different from the first pattern onto the object, as the second pattern. Accordingly, the control apparatus can perform a three-dimensional measurement based on one of the first patterns based on the resolution of the selected first pattern, or one of the patterns different from the first pattern onto the object.

Still another aspect of the invention is directed to a robot including: a projection unit configured to project a first pattern onto an object; and a selection unit configured to select a single first pattern from a plurality of the first patterns. After the projection unit projects each of the plurality of first patterns having different resolutions onto the object, the projection unit projects a second pattern onto the object, the second pattern having the same resolution as that of the selected single first pattern.

With this configuration, the robot projects each of the plurality of first patterns having different resolutions onto the object, selects a single first pattern from the plurality of first patterns, and projects the second pattern onto the object, the second pattern having the same resolution as that of the selected single first pattern. Accordingly, the robot can perform a three-dimensional measurement suitable for the material or the shape of a measurement target, and as a result, can perform work highly accurately.

Yet another aspect of the invention is directed to a control method including: projecting each of a plurality of first patterns having different resolutions onto an object; selecting a single first pattern from the plurality of first patterns; and projecting a second pattern onto the object, the second pattern having the same resolution as that of the selected single first pattern.

With this configuration, using the control method, each of the plurality of first patterns having the different resolutions is projected, the single first pattern is selected from the plurality of first patterns, and the second pattern is projected onto the object, the second pattern having the same resolution as that of the selected single first pattern. Accordingly, it is possible to perform a three-dimensional measurement suitable for the material or the shape of a measurement target using the control method.

As such, using the control apparatus, the robot, and the control method, each of the plurality of first patterns having the different resolutions is projected onto the object, the single first pattern is selected from the plurality of first patterns, and the second pattern is projected onto the object, the second pattern having the same resolution as that of the selected single first pattern. Accordingly, it is possible to perform a three-dimensional measurement suitable for the material or the shape of a measurement target, using the control apparatus, the robot, and the control method.

BRIEF DESCRIPTION OF THE DRAWINGS

The invention will be described with reference to the accompanying drawings, wherein like numbers reference like elements.

FIGS. 2A to 2F are images illustrating a plurality of captured images that capture a range inclusive of a measurement target onto which each of random dot pattern images having different dot sizes is projected.

DESCRIPTION OF EXEMPLARY EMBODIMENTS

Embodiment

Figure 1:
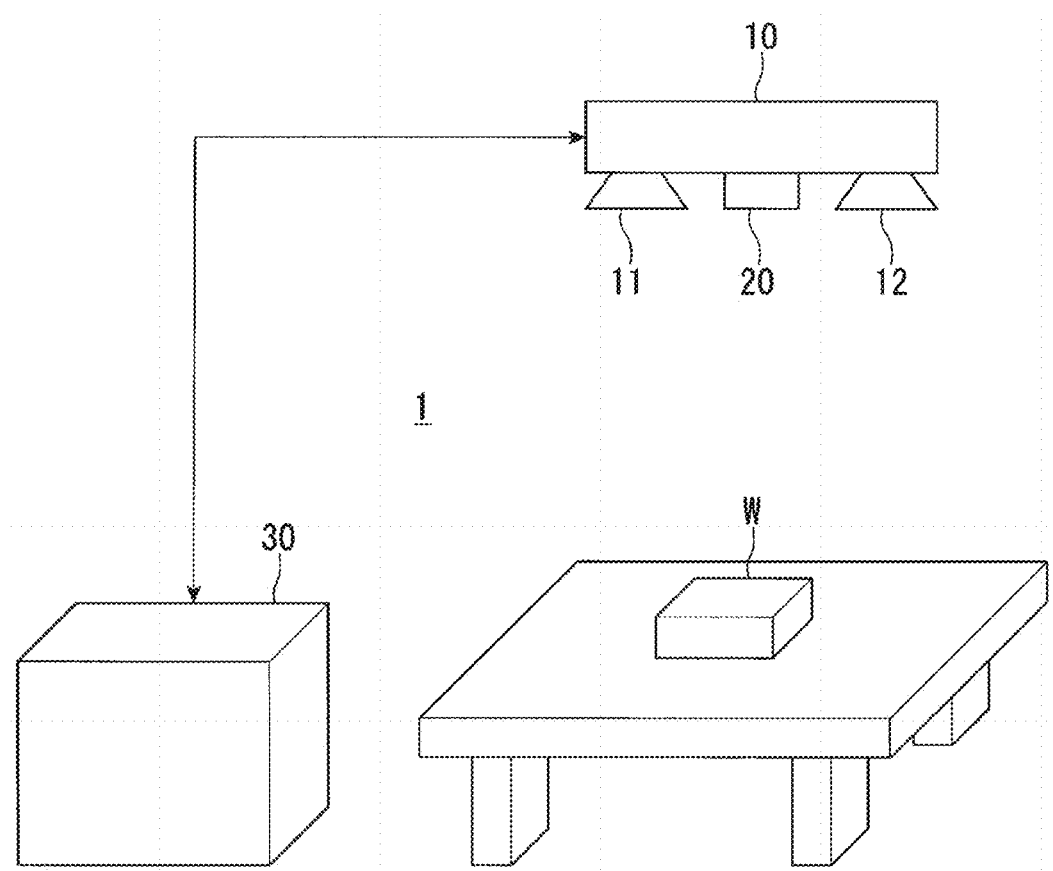
FIG. 1 is a view illustrating an example of the configuration of a control system according to an embodiment.

Hereinafter, embodiments will be described with reference to the accompanying drawings. FIG. 1 is a view illustrating an example of the configuration of a control system 1 according to an embodiment. The control system 1 includes an imaging unit 10; a projection unit 20; and a control apparatus 30. The imaging unit 10 includes a first imaging unit 11 and a second imaging unit 12, and captures an image stereoscopically. The imaging unit 10 may be configured to include three or more imaging units. In the following description, when it is not necessary to differentiate between the first imaging unit 11 and the second imaging unit 12, for descriptive purposes, the first imaging unit 11 and the second imaging unit 12 are collectively referred to as the imaging unit 10. In the following description, when the first imaging unit 11 and the second imaging unit 12 are collectively referred to as the imaging unit 10, the first imaging unit 11 and the second imaging unit 12 perform the same process. A technology according to the embodiment to be described hereinafter can be used for typical image processing. The typical image processing is bin picking, the recognition of a surrounding environment of a workbench or the like, the inspection of a work target, and the like.

In the control system 1, the projection unit 20 projects a pattern image onto a measurement target W installed on a bench such as a table, and the imaging unit 10 captures an image of the measurement target W onto which the pattern image is projected. The control system 1 measures the measurement target W three-dimensionally using a stereo block matching method or the like, based on a first captured image obtained by the first imaging unit 11 and a second captured image obtained by the second imaging unit 12. The control system 1 performs various processes based on the three-dimensional measurement. For example, the various processes based on the three-dimensional measurement are processes of generating a three-dimensional point cloud; however, instead of that, the various processes may be any other processes. For descriptive purposes, the following description will be given on the condition that the control system 1 measures the measurement target W three-dimensionally, and generates a three-dimensional point cloud based on the three-dimensional measurement. In the following description, when it is not necessary to differentiate between the first captured image and the second captured image, the first captured image and the second captured image are collectively referred to as a captured image. A case in which it is not necessary to differentiate between the first captured image and the second captured image implies a case in which both the first captured image and the second captured image undergo the same process.

The measurement target W is an object which is three-dimensionally measured by the control system 1, and onto which the above-mentioned pattern image can be projected. The material of the measurement target W may be a non-transparent material (metal, paper, or the like that does not allow light to pass therethrough), or a semitransparent material (acrylic, plastic, or the like that allows a part of light to pass therethrough). The shape of the measurement target W is not limited to a specific shape, and when a surface shape is featureless, effects obtained from the processes performed by the control system 1 become most remarkably apparent. The measurement target W is an example of an object.

In the embodiment, the measurement target W is a semi-transparent cube-shaped connector made of acrylic; however, as described above, the material or the shape of the measurement target W is not limited to those in the embodiment, and may be any other material or shape. The measurement target W is preferably not an object which allows most of light of a pattern image from the projection unit 20 to pass therethrough, and does not allow light of the pattern image reflected from the measurement target W to be detected in a captured image.

Here, the pattern image is a binary image, for example, a random dot pattern image; however, the pattern image is not limited to the binary image, and any pattern image may be used insofar as the pattern image can be displayed using two values, such as a barcode, and can offer feature points in order for the measurement target W to be measured three-dimensionally via the stereo block matching method or the like. For descriptive purposes, the following description will be given on the condition that the pattern image is a random dot pattern image.

The random dot pattern image is a binary image that is depicted by a first color and a second color different from the first color, and an image that is depicted by randomly disposing quadrate dots or rectangular dots which are minimum units. Typically, in many cases, one of the first color and the second color is a white color, and the other is a black color; however, the first color and the second color are not limited to the white color or the black color. The size of a dot is expressed by the number of pixels used to depict the dot, and in the following description, the size of a dot is referred to as a dot size. As described above, the dot may have a quadrate shape or a rectangular shape. The random dot pattern image is an example of the binary image.

The fact that images have different dot sizes implies that the images have different resolutions. The resolution is a numeric number indicative of a density of pixels in an image. When the resolution is low, the size of the minimum units forming a figure depicted in an image is large, and the contour of the figure is coarse. When the resolution is high, the size of the minimum units forming a figure depicted in an image is small, and the contour of the figure is fine. That is, when the resolution of a pattern image formed from the dots is low, the dot size is large, and when the resolution is high, the dot size is small.

When a random dot pattern image is projected onto the measurement target W, bleeding occurs in the random dot pattern image in a captured image depending on the material or the shape of the measurement target W. Here, when a random pattern image is formed from white dots and black dots, the bleeding implies that it is not possible to recognize the boundary between the white dot and the black dot. The reason for the bleeding is an aberration that occurs depending on the material or the shape of the measurement target W when reflected light is incident on an imaging element of the imaging unit 10. Accordingly, the degree of the bleeding is different for the material or the shape of the measurement target W. It is possible to decrease the degree of the bleeding by using a random dot pattern image having a dot size suitable for the material or the shape of the measurement target W, and as a result, it is possible to increase the accuracy of a three-dimensional measurement.

Hereinafter, a random dot pattern image having a dot size suitable for the material of the measurement target W will be described with reference to FIGS. 2A to 2F. FIGS. 2A to 2F are images illustrating a plurality of captured images that capture a range inclusive of the measurement target W onto which each of random dot pattern images having different dot sizes is projected. The captured image illustrated in FIG. 2A captures a range inclusive of the semitransparent acrylic measurement target W onto which a random dot pattern image having a dot size of one pixel is projected.

The captured image illustrated in FIG. 2B captures a range inclusive of the semitransparent acrylic measurement target W onto which a random dot pattern image having a dot size of four pixels is projected. The captured image illustrated in FIG. 2C captures a range inclusive of the semitransparent acrylic measurement target W onto which a random dot pattern image having a dot size of ten pixels is projected.

A white frame WR in FIGS. 2A to 2C illustrates the contour of the measurement target W. A black region in the white frame WR indicates a region in which a three-dimensional point cloud is successfully formed when generating the three-dimensional point cloud based on the projected random dot pattern image, the three-dimensional point cloud being a basis for a three-dimensional measurement. As illustrated in FIG. 2A, when a dot size is one pixel, the control system 1 fails to generate a three-dimensional point cloud in a wide region in the white frame WR.

When a dot size is ten pixels, similar to the case in FIG. 2C, the control system 1 fails to generate a three-dimensional point cloud in a wide region. In contrast, as illustrated in FIG. 2B, when a dot size is four pixels, the control system 1 succeeds in generating a three-dimensional point cloud in a wide region. In a comparison between FIGS. 2A, 2B, and 2C, it can be seen that the measurement target W in the captured images illustrated in FIGS. 2A to 2C is preferably measured three-dimensionally using the random dot pattern image having a dot size of four pixels.

In contrast, the captured image illustrated in FIG. 2D captures a range inclusive of the non-transparent measurement target W made of corrugated paper, onto which an random dot pattern image having a dot size of one pixel is projected. The captured image illustrated in FIG. 2E captures a range inclusive of the non-transparent measurement target W made of corrugated paper, onto which a random dot pattern image having a dot size of four pixels is projected. The captured image illustrated in FIG. 2F captures a range inclusive of the non-transparent measurement target W made of corrugated paper, onto which a random dot pattern image having a dot size of ten pixels is projected.

As illustrated in FIGS. 2D to 2F, it can be seen that the control system 1 succeeds in generating a three-dimensional point cloud in most of a region in the white frame WR for any dot size when the material of the measurement target W is non-transparent corrugated paper. That is, when the material of the measurement target W is non-transparent corrugated paper, the accuracy of the three-dimensional measurement does not change considerably with a change in the dot size of the random dot pattern image. As illustrated in FIG. 2F, since the control system 1 fails to generate a three-dimensional point group in part of a region in the white frame WR when a dot size is ten pixels, it can been seen that the measurement target W is preferably measured three-dimensionally when the dot size is smaller than ten pixels.

Here, the non-transparent measurement target W made of corrugated paper and the semitransparent acrylic measurement target W have different materials and shapes (in this example, the shape implies a surface shape; however, the shape may be a three-dimensional shape). As illustrated in FIGS. 2A to 2F, the control system 1 can highly accurately measure the three-dimensions of the measurement target W using a random dot pattern image suitable for the material or the shape of the measurement target W.

Before the control system 1 of the embodiment measures the measurement target W three-dimensionally, the control system 1 performs a pattern image selection process of selecting a random dot pattern image having a dot size suitable for the shape or the material of the measurement target W. Accordingly, the control system 1 can perform a three-dimensional measurement suitable for the material or the shape of the measurement target W. More specifically, the control system 1 generates a three-dimensional point cloud which is the basis for a three-dimensional measurement of the measurement target W by projecting a random dot pattern image onto the measurement target W, the random dot pattern image being selected by the pattern image selection process.

For example, the first imaging unit 11 is a camera equipped with a charge coupled device (CCD), a complementary metal oxide semiconductor (CMOS), or the like which is an imaging element configured to convert concentrated light into an electric signal. The first imaging unit 11 is communicably connected to the control apparatus 30 via a cable. Wire communication via a cable is performed in accordance with a standard such as Ethernet (trademark) or universal serial bus (USB). The first imaging unit 11 and the control apparatus 30 may be connected to each other via wireless communication performed in accordance with a communication standard such as Wi-Fi (trademark). The first imaging unit 11 is installed at a position in which the first imaging unit 11 can capture an image of a range inclusive of the measurement target W. The first imaging unit 11 may capture a still image of the range inclusive of the measurement target W as the first captured image, or may capture a moving image of the range as the first captured image.

For example, the second imaging unit 12 is a camera equipped with a CCD, a CMOS, or the like which is an imaging element configured to convert concentrated light into an electric signal. The second imaging unit 12 is communicably connected to the control apparatus 30 via a cable. Wire communication via a cable is performed in accordance with a standard such as Ethernet (trademark) or universal serial bus (USB). The second imaging unit 12 and the control apparatus 30 may be connected to each other via wireless communication performed in accordance with a communication standard such as Wi-Fi (trademark). The second imaging unit 12 is installed at a position in which the second imaging unit 12 can capture an image of the range inclusive of the measurement target W. The second imaging unit 12 may capture a still image of the range inclusive of the measurement target W as the second captured image, or may capture a moving image of the range as the second captured image.

In this example, each of the first imaging unit 11 and the second imaging unit 12 is configured to be integrated as the imaging unit 10 and to capture an image of the range inclusive of the measurement target W; however, instead of that, the first imaging unit 11 and the second imaging unit 12 may be configured to be installed at different positions, and to capture an image of the range inclusive of the measurement target W from the different positions. The following description will be given on the condition that the first imaging unit 11 and the second imaging unit 12 are pre-calibrated, and a relative position therebetween and the postures thereof are already known. The first imaging unit 11 and the second imaging unit 12 can make up for mutual dead spaces (occlusion).

The projection unit 20 is a projector in which a reflective liquid crystal panel, a transmissive liquid crystal panel, a digital mirror device (DMD), or the like is used, and which projects various projection images acquired from the control apparatus 30. The projection unit 20 is installed at a position in which the projection unit 20 can project the projection image onto the region inclusive of the measurement target W. In FIG. 1, the projection unit 20 is formed integrally with the imaging unit 10; however, instead of that, the projection unit 20 may be installed separately from the imaging unit 10 at a position different from the position of the imaging unit 10. The following description will be given on the condition that the projection unit 20 is pre-calibrated along with the imaging unit 10, and a relative position between the projection unit 20 and the imaging unit 10 and the postures thereof are already known. The projection unit 20 is an example of the projection unit.

The control apparatus 30 controls the projection unit 20 to project each of a plurality of pre-stored grid pattern images having different dot sizes onto the measurement target W. The grid pattern image is a pattern image in which dots are alternately disposed in a grid pattern. Hereinafter, a grid pattern image projected onto the measurement target W in the pattern image selection process by the control apparatus 30 will be described with reference to FIG. 3.

Figure 3:
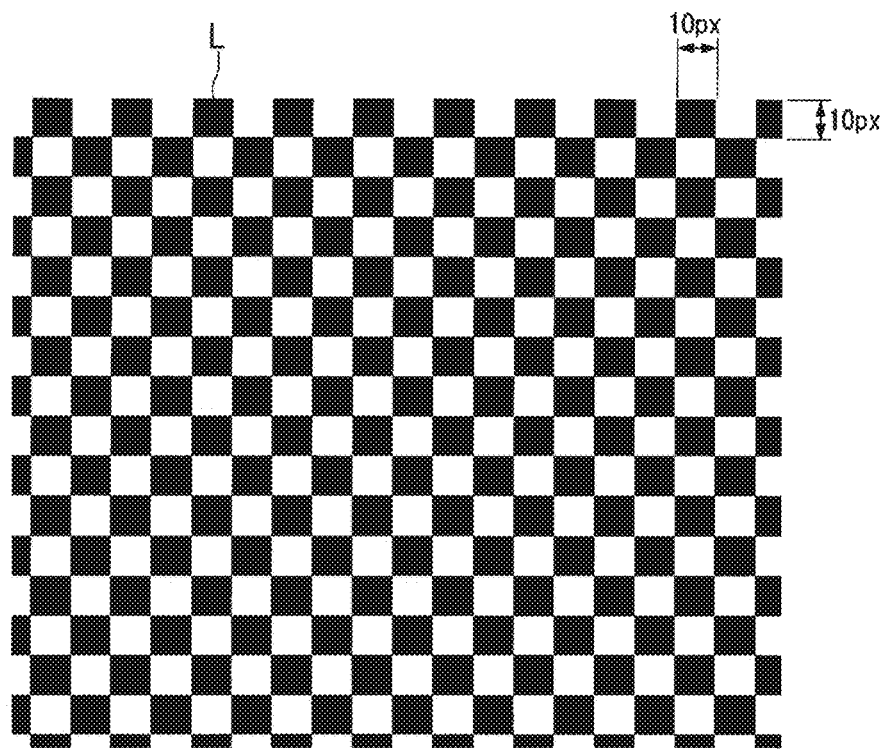
FIG. 3 is a view illustrating an example of a grid pattern image that is projected onto the measurement target in a pattern image selection process by a control apparatus.

FIG. 3 is a view illustrating an example of a grid pattern image that is projected onto the measurement target W in the pattern image selection process by the control apparatus 30. A grid pattern image L illustrated in FIG. 3 has a dot size of ten pixels. The control apparatus 30 projects each of the grid pattern images having different dot sizes onto the measurement target W in the pattern image selection process. The grid pattern image is an example of a first pattern. The plurality of grid pattern images having different dot sizes are examples of a plurality of the first patterns having different resolutions.

Figure 4:
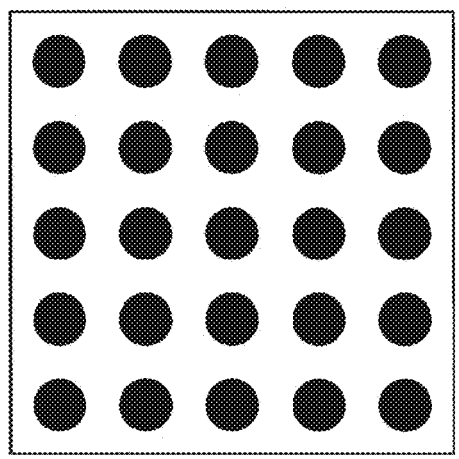
FIG. 4 is an example of a dot pattern image having a black water drop pattern on a white background.
Figure 5:
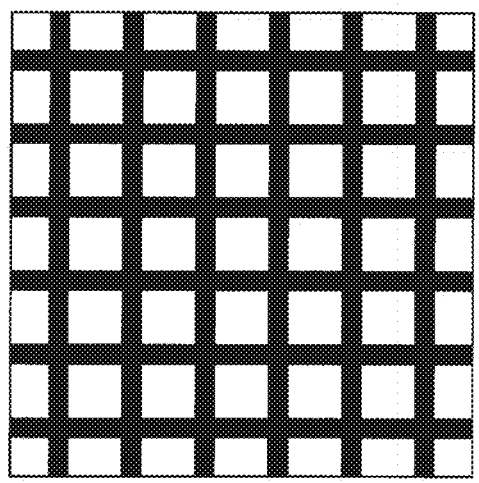
FIG. 5 is an example of a dot pattern image having a plurality of orthogonal black lines on a white background.

As illustrated in FIG. 4, in the pattern image selection process, the control apparatus 30 may use a dot pattern image having a black water drop pattern on a white background (or a white water drop pattern on a black background) or the like instead of the grid pattern image. FIG. 4 is an example of the dot pattern image having a black water drop pattern on a white background. As illustrated in FIG. 5, in the pattern image selection process, the control apparatus 30 may use a dot pattern image having a plurality of orthogonal black lines on a white background or the like instead of the grid pattern image. FIG. 5 is an example of a dot pattern image having a plurality of orthogonal black lines on a white background.

Figure 6:
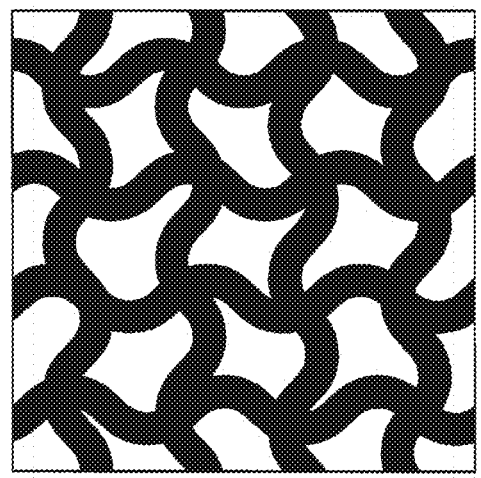
FIG. 6 is an example of a dot pattern image having a plurality of intersecting black wavy lines on a white background.

As illustrated in FIG. 6, in the pattern image selection process, the control apparatus 30 may use a dot pattern image having a plurality of intersecting black wavy lines on a white background or the like instead of the grid pattern image. FIG. 6 is an example of a dot pattern image having a plurality of intersecting black wavy lines on a white background. When the black wavy lines in FIG. 6 have the same direction of travel, the wavy lines have different phases.

The common characteristics of the images illustrated in FIGS. 3 to 6 are that an overall distribution of white regions and black regions are uniform (for example, one to one ratio or the like). The reason for this is that the white regions and the black regions are preferably distributed uniformly in a pattern image used in the pattern image selection process; however, the pattern image is not limited to that configuration, and may be an image in which the white regions and black regions are non-uniformly distributed. The embodiment is described on the condition that a grid pattern image used in the pattern image selection process by the control apparatus 30 is a binary image depicted by the white color and the black color; however, instead of that, the grid pattern image may be a binary image depicted by the first color (any of colors other than the white color and the black color), and the second color (any of colors other than the white color and the black color) different from the first color. In the embodiment, the white color is a color that has a color gradient of 0 among 255 color gradients, and may be a color that has a color gradient close to 0. In the embodiment, the black color is a color that has a color gradient of 255 among 255 color gradients, and may be a color that has a color gradient close to 255.

The control apparatus 30 controls the imaging unit 10 to capture an image of the measurement target W onto which a grid pattern image is projected. The control apparatus 30 performs the pattern image selection process based on a captured image obtained by the imaging unit 10, and selects a random dot pattern image having a dot size suitable for the measurement target W. The control apparatus 30 controls the projection unit 20 to project the selected random dot pattern image onto the measurement target W, the random dot pattern image having a dot size suitable for the measurement target W. The control apparatus 30 controls the imaging unit 10 to capture an image of the measurement target W onto which the random dot pattern image is projected, and generates a three-dimensional point cloud by performing a three-dimensional measurement based on the captured image.

Figure 7:
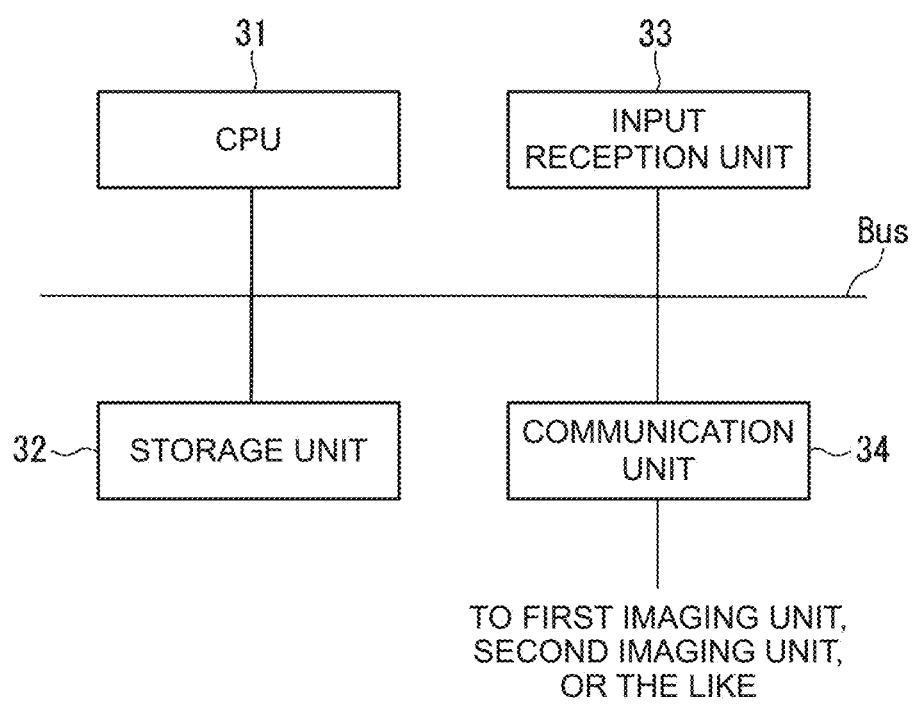
FIG. 7 is a diagram illustrating an example of the hardware configuration of the control apparatus.

Subsequently, a hardware configuration of the control apparatus 30 will be described with reference to FIG. 7. FIG. 7 is a diagram illustrating an example of the hardware configuration of the control apparatus 30. For example, the control apparatus 30 includes a central processing unit (CPU) 31; a storage unit 32; an input reception unit 33; and a communication unit 34, and communicates with the first imaging unit 11, the second imaging unit 12, and the projection unit 20 via the communication unit 34. These configuration elements are communicably connected to each other via a bus. The CPU 31 executes various programs stored in the storage unit 32.

The storage unit 32 includes a hard disk drive (HDD), a solid state drive (SSD), an electrically erasable programmable read-only memory (EEPROM), a read-only memory (ROM), a random access memory (RAM), and the like, and stores various pieces of information and images processed by the control apparatus 30, and programs. Instead of being built into the control apparatus 30, the storage unit 32 may be an external storage device connected to the control apparatus 30 via a digital input and output port such as a USB.

The input reception unit 33 is a keyboard, a mouse, a touch pad, or any other input device. The input reception unit 33 may work as a display unit, and may be a touch panel.

The communication unit 34 is configured to include a digital input and output port such as a USB, an Ethernet port, and the like.

Figure 8:
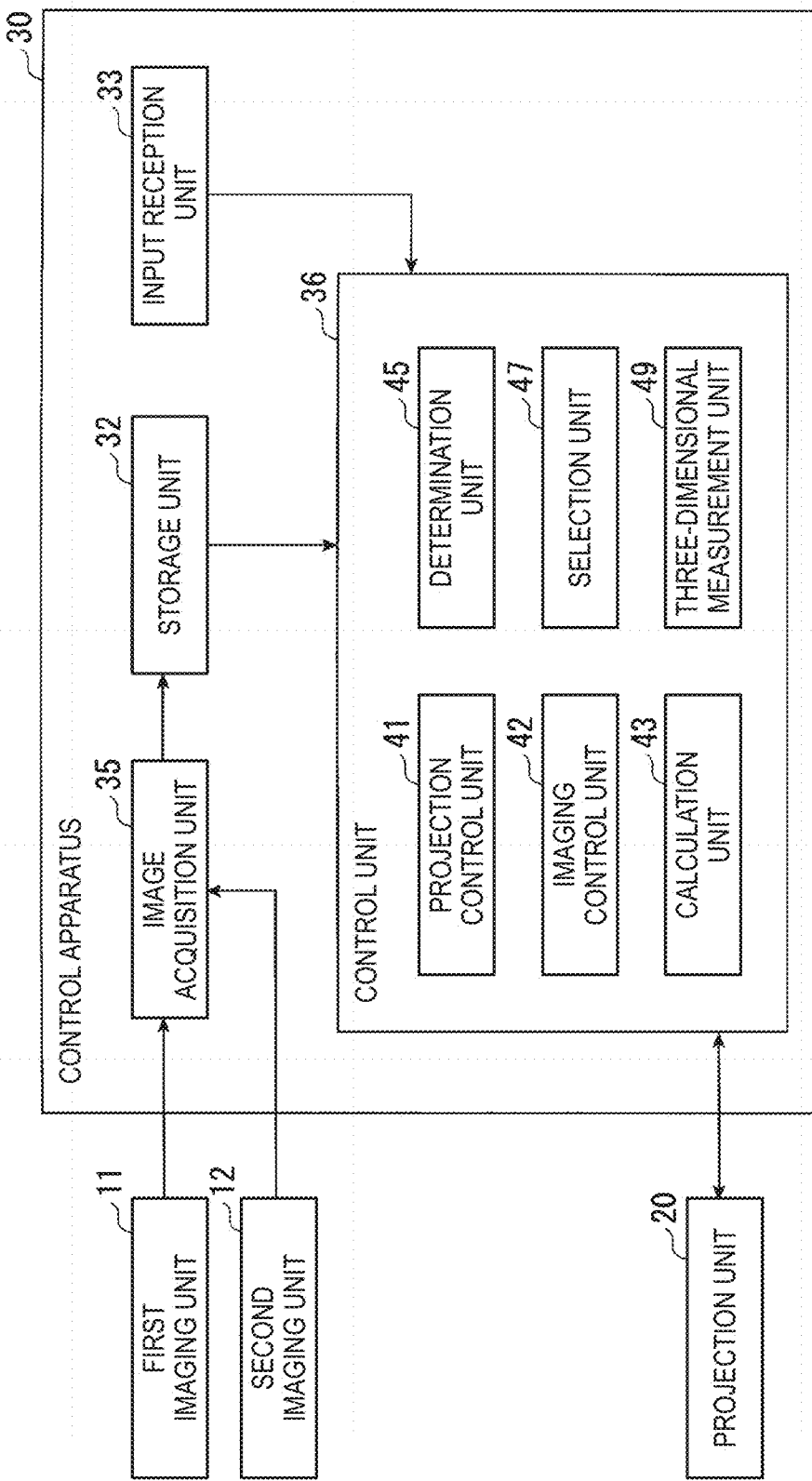
FIG. 8 is a diagram illustrating an example of the functional configuration of the control apparatus.

Subsequently, the functional configuration of the control apparatus 30 will be described with reference to FIG. 8. FIG. 8 is a diagram illustrating an example of the functional configuration of the control apparatus 30. The control apparatus 30 includes the storage unit 32; the input reception unit 33; an image acquisition unit 35; and a control unit 36. For example, a part or all of the functional units of the control unit 36 are realized when the CPU 31 executes various programs stored in the storage unit 32. A part or all of the functional units may be hardware functional units such as a large scale integration (LSI) and an application specific integrated circuit (ASIC).

The image acquisition unit 35 acquires the first captured image obtained by the first imaging unit 11. The image acquisition unit 35 acquires the second captured image obtained by the second imaging unit 12. The image acquisition unit 35 stores the acquired first captured image and second captured image in the storage unit 32 in a state where the first captured image and the second captured image are associated with each other. At this time, the image acquisition unit 35 stores the dot size of a grid pattern image projected when a captured image is obtained, and the captured image in the storage unit 32, in a state where the dot size and the captured image are associated with each other. In the following description, for descriptive purposes, a captured image associated with a dot size is referred to as a captured image set.

The control unit 36 includes a projection control unit 41; an imaging control unit 42; a calculation unit 43; a determination unit 45; a selection unit 47; and a three-dimensional measurement unit 49. When the control unit 36 receives an input of an operation of starting a measurement from the input reception unit 33 by a user, the control unit 36 controls the functional units to perform the pattern image selection process. After a random dot pattern image suitable for the material or the shape of the measurement target W is selected, the control unit 36 controls the functional units to generate a three-dimensional point cloud which is the basis for a three-dimensional measurement of the measurement target W.

The projection control unit 41 selects the plurality of grid pattern images (the images having different dot sizes) from the storage unit 32 one by one in order, outputs the selected grid pattern image to the projection unit 20, and controls the projection unit 20 to project the selected grid pattern image. The projection control unit 41 controls the projection unit 20 to project a random dot pattern image onto the measurement target W, the random dot pattern image having a dot size selected by the selection unit 47. The projection control unit 41 controls the projection unit 20 to project a white image onto the measurement target W. The white image is an image in which the color of all pixels is white. The projection control unit 41 controls the projection unit 20 to project a black image onto the measurement target W. The black image is an image in which the color of all pixels is black.

The imaging control unit 42 controls the imaging unit 10 to capture an image of the range inclusive of the measurement target W.

The calculation unit 43 reads captured image sets from the storage unit 32. The calculation unit 43 selects the read captured image sets one by one in order, and calculates a statistic on a distribution of the white colors and the black colors (in other words, a luminance) of a grid pattern image in a captured image for each captured image associated with the selected captured image set. In an example given hereinafter, the statistic is a dispersion for a luminance distribution; however, instead of that, the statistic may be a dispersion for luminance levels between a high luminance level and a low luminance level, or any other statistic may be defined. In the following description, a captured image associated with a captured image set is referred to as a grid pattern captured image.

The determination unit 45 determines whether a dispersion for a luminance distribution in grid pattern captured images for each dot size is a predetermined value or greater, the dispersion for a luminance distribution being calculated by the calculation unit 43. The determination unit 45 reads grid pattern captured images from the storage unit 32, the dispersions for which being determined to be the predetermined value or greater. The determination unit 45 is configured to perform a process of determining whether the dispersion for the grid pattern captured images for both of the first captured image and the second captured image is the predetermined value or greater; however, instead of that, the determination unit 45 may be configured to perform the process for either one of the first captured image and the second captured image.

The selection unit 47 extracts a grid pattern captured image, which satisfies a predetermined condition, from the grid pattern captured images read by the determination unit 45. The "predetermined condition" implies that a grid pattern captured image having the smallest associated dot size is extracted; however, instead of that, a grid pattern captured image may be extracted via any process based on the associated dot size.

In the following description, the predetermined condition implies that a grid pattern captured image having the smallest associated dot size is extracted. The selection unit 47 selects a dot size associated with the extracted grid pattern captured image. The selection unit 47 reads a random dot pattern image having the selected dot size from the storage unit 32 (in other words, a random dot pattern image having a dot size suitable for the material or the shape of the measurement target W is selected).

The three-dimensional measurement unit 49 controls the projection control unit 41 to project the random dot pattern image onto the measurement target W, the random dot pattern image being read from the storage unit 32 by the selection unit 47. The three-dimensional measurement unit 49 controls the imaging control unit 42 to capture an image of the range inclusive of the measurement target W onto which the random dot pattern image is projected. In the following description, a measurement image refers to the captured image that the three-dimensional measurement unit 49 controls the imaging control unit 42 to obtain. The three-dimensional measurement unit 49 reads a measurement image (measurement image being stored in the storage unit 32 from the image acquisition unit 35) from the storage unit 32. The three-dimensional measurement unit 49 generates a three-dimensional point cloud for the measurement target W using the stereo block matching method, based on the read measurement image.

Figure 9:
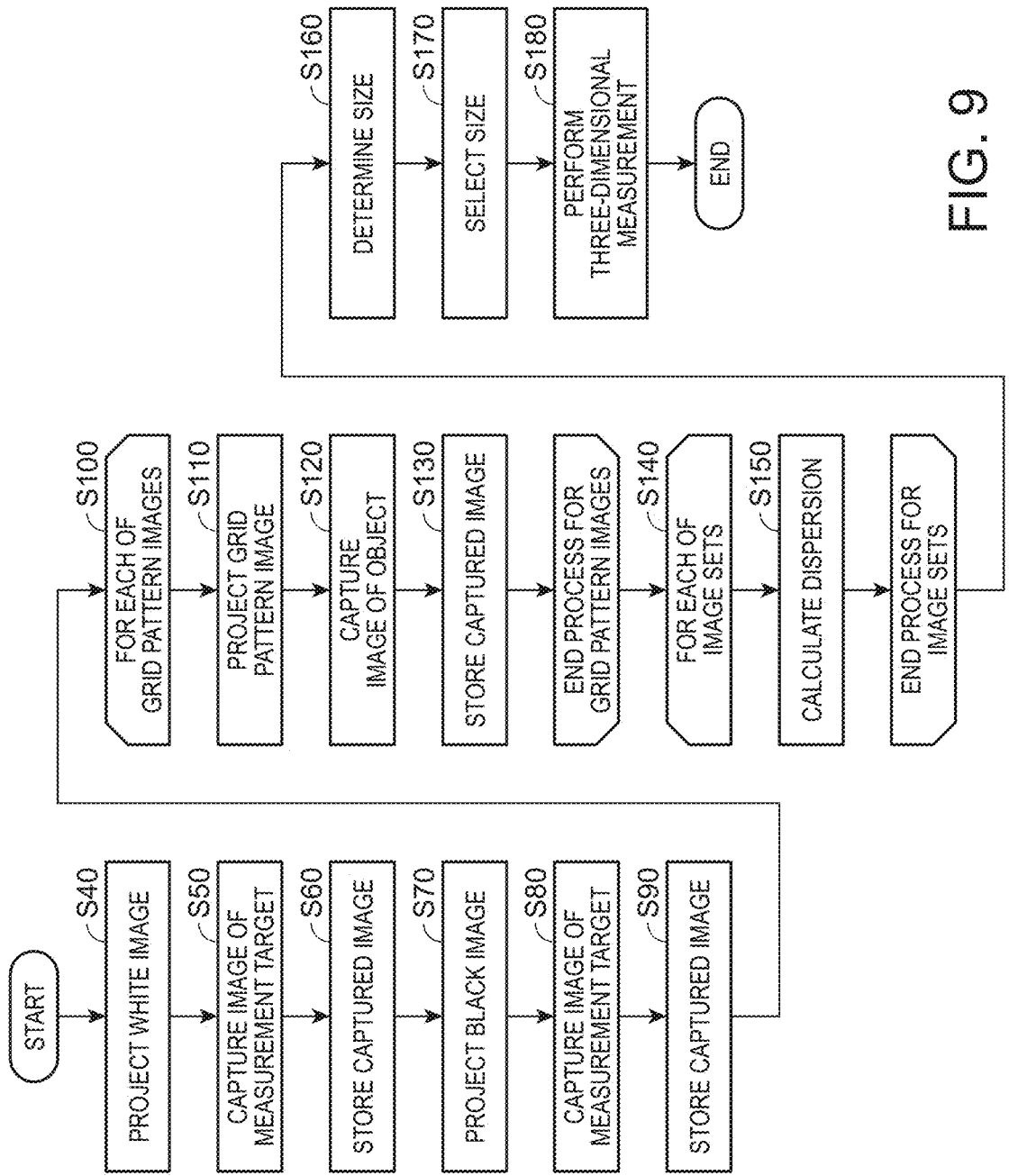
FIG. 9 is a flowchart illustrating an example of a flow of a pattern image selection process performed by the control apparatus.
Figure 10:
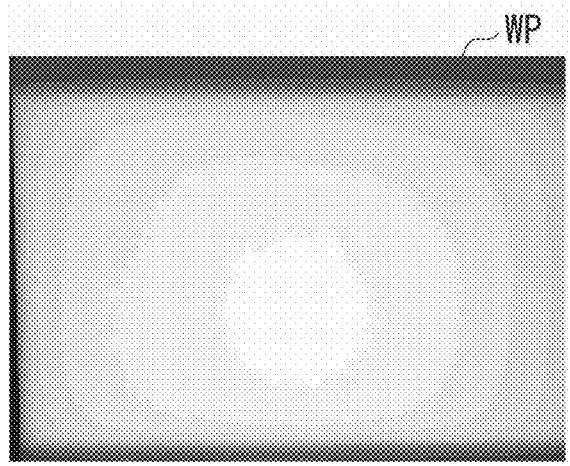
FIG. 10 is an image illustrating an example of a white captured image.

Hereinafter, the pattern image selection process performed by the control apparatus 30 will be described with reference to FIG. 9. FIG. 9 is a flowchart illustrating an example of the flow of the pattern image selection process performed by the control apparatus 30. First, the projection control unit 41 controls the projection unit 20 to project a white image onto the measurement target W (step S40). Subsequently, the imaging control unit 42 controls the imaging unit 10 to obtain a captured image (hereinafter, referred to as a white captured image) of a white image illustrated in FIG. 10 projected onto the measurement target W (step S50). Here, FIG. 10 is an image illustrating an example of a white captured image WP.

Figure 11:
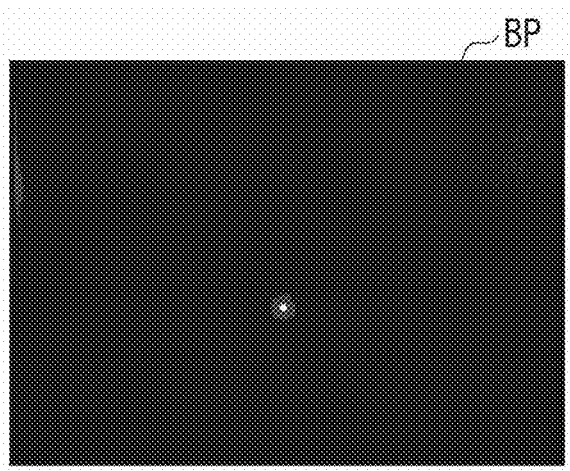
FIG. 11 is an image illustrating an example of a black captured image.

Subsequently, the image acquisition unit 35 acquires the white captured image from the imaging unit 10, and stores the acquired white captured image in the storage unit 32 (step S60). Subsequently, the projection control unit 41 controls the projection unit 20 to project a black image onto the measurement target W (step S70). Subsequently, the imaging control unit 42 controls the imaging unit 10 to obtain a captured image (hereinafter, referred to as a black captured image) of a black image illustrated in FIG. 11 projected onto the measurement target W (step S80). Here, FIG. 11 is an image illustrating an example of a black captured image BP. Subsequently, the image acquisition unit 35 acquires the black captured image from the imaging unit 10, and stores the acquired black captured image in the storage unit 32 (step S90).

Subsequently, the projection control unit 41 reads a plurality of grid pattern images having different dot sizes from the storage unit 32, selects the read grid pattern images one by one in order (for example, in decreasing order of dot size, in increasing order of dot size, or in a random order) and repeats step S110 to step S130 for each of the selected grid pattern images (step S100). When one of the grid pattern images is selected in step S100, the projection control unit 41 controls the projection unit 20 to project the selected grid pattern image onto the measurement target W (step S110).

Figure 12:
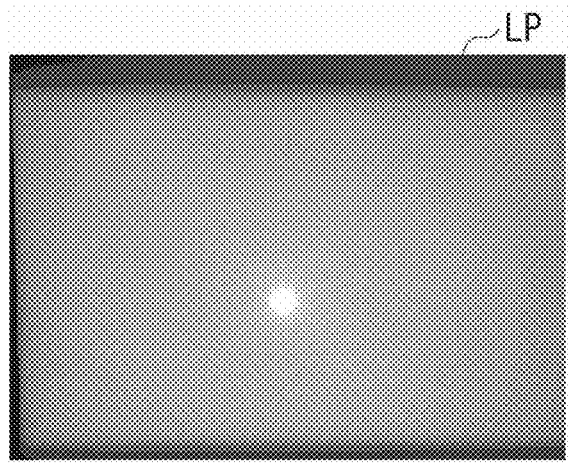
FIG. 12 is an image illustrating an example of a grid pattern captured image.

Subsequently, the imaging control unit 42 controls the imaging unit 10 to obtain a grid pattern captured image (captured image illustrated in FIG. 12 of the grid pattern image projected onto the measurement target W in step S110) (step S120). Here, FIG. 12 is an image illustrating an example of a grid pattern captured image LP. Subsequently, the image acquisition unit 35 acquires the grid pattern captured image from the imaging unit 10. The image acquisition unit 35 stores a captured image set in the storage unit 32, the captured image set corresponding the obtained grid pattern captured image to the dot size of the grid pattern image projected in step S110 (step S130).

After the storage unit 32 stores the captured image sets for all of the grid pattern images in step S100 to step S130, the calculation unit 43 reads the white captured image and the black captured image from the storage unit 32. The calculation unit 43 reads the captured image sets stored in the storage unit 32 by the image acquisition unit 35, selects the read captured image sets one by one in order (for example, in decreasing order of dot size, in increasing order of dot size, or in a random order), and repeats step S150 for the selected captured image sets (step S140). After the captured image set is selected in step S140, the calculation unit 43 calculates a dispersion for a distribution of white colors and black colors in the region of the measurement target W in the grid pattern captured image associated with the selected captured image set (step S150).

Here, a dispersion calculation process performed by the calculation unit 43 will be described with reference to FIGS.

13A to 15B. The calculation unit 43 detects the region of the measurement target W in the grid pattern captured image using pattern matching, edge detection, or the like. The calculation unit 43 selects pixels in the region of the measurement target W in the captured image one by one, and detects a luminance of the selected pixel.

Here, for descriptive purposes, a coordinate value indicative of a selected pixel in the captured image is denoted by (i, j), and a luminance of the coordinate value is denoted by I(i, j). i denotes an x coordinate value, and j denotes a y coordinate value. The calculation unit 43 detects a luminance $I\_0(i, j)$ of a pixel in the white captured image denoted by the same coordinate value as the coordinate value (i, j) for the selected pixel. The calculation unit 43 detects a luminance $I\_255(i, j)$ of a pixel in the black captured image denoted by the same coordinate value as the coordinate value (i, j) for the selected pixel.

The calculation unit 43 calculates a normalized luminance $I\_N(i, j)$ using Expression (1) based on the three detected luminances $I(i, j)$, $I\_0(i, j)$, and $I\_255(i, j)$.

$$I\_N(i,j)=(I(i,j)-I\_0(i,j))/(I\_255(i,j)-I\_0(i,j)) \quad (1)$$

According to Expression (1), a normalized luminance is defined as a value obtained by normalizing a difference in the luminance of the measurement target W between the white captured image and the grid pattern captured image with a difference in the luminance of the measurement target W between the white captured image and the black captured image.

The calculation unit 43 calculates normalized luminances of all of pixels in the region of the measurement target W in the grid pattern captured image. The calculation unit 43 calculates a dispersion for normalized luminances based on the calculated normalized luminances. At this time, the dispersion for the normalized luminances becomes a different value depending on the material or the shape of the measurement target W, and the dot size of the grid pattern image. For example, when the material or the shape of the measurement target W and the dot size of the grid pattern image change, a histogram indicative of a dispersion for normalized luminances is illustrated as in FIGS. 13A to 15B.

Figure 13A:
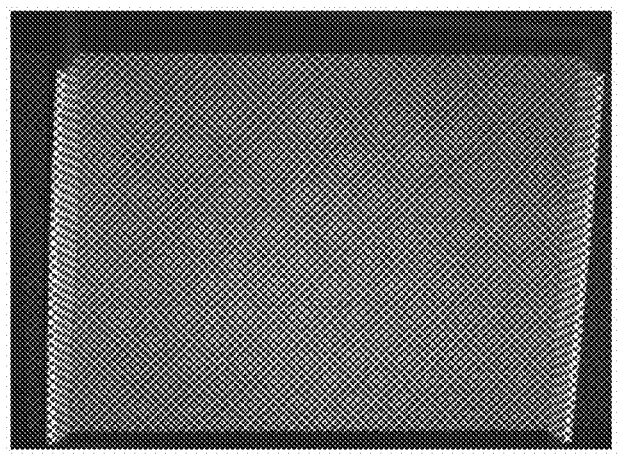
FIGS. 13A and 13B illustrate an example of a grid pattern captured image and an example of a histogram indicative of a dispersion for normalized luminances for the grid pattern captured image when a grid pattern image having a dot size of ten pixels is projected onto the non-transparent measurement target made of corrugated paper.
Figure 13B:
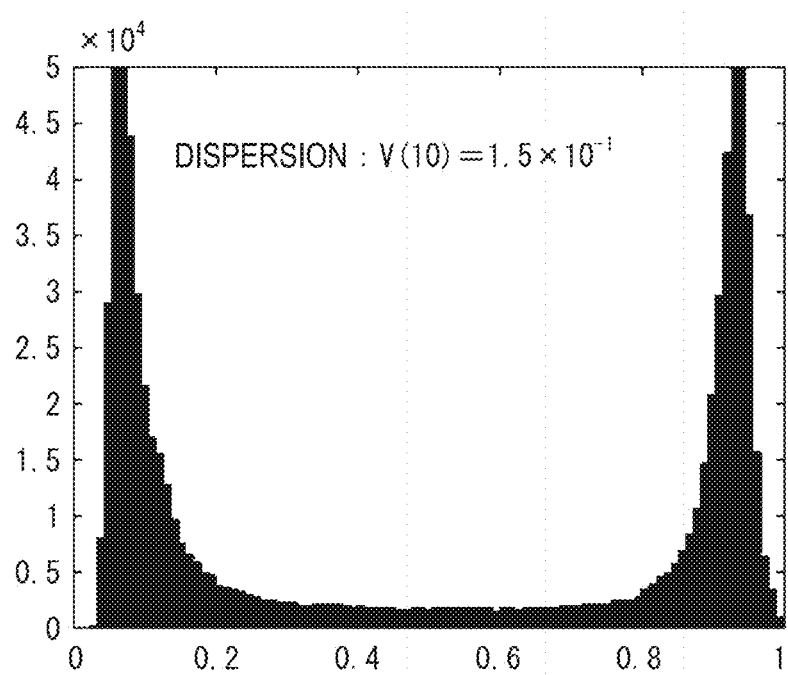

FIGS. 13A and 13B illustrate an example of a grid pattern captured image and an example of a histogram indicative of a dispersion for normalized luminances when a grid pattern image having a dot size of ten pixels is projected onto the non-transparent measurement target W made of corrugated paper. FIG. 13A illustrates an example of the grid pattern captured image when the grid pattern image having a dot size of ten pixels is projected onto the non-transparent measurement target W made of corrugated paper. FIG. 13B illustrates an example of the histogram indicative of the dispersion for the normalized luminances of the grid pattern captured image illustrated in FIG. 13A.

In the example illustrated in FIG. 13A, the histogram indicative of the dispersion for the normalized luminances is a histogram having two peaks as illustrated in FIG. 13B. The reason for the formation of the two peaks in the histogram is that the degree of bleeding in the grid pattern captured image of the grid pattern image projected onto the measurement target W is small, and a luminance in the boundary between the white color and the black color of the grid pattern captured image changes steeply because the material of the measurement target W is non-transparent corrugated paper. When the degree of bleeding in the grid pattern captured image of the grid pattern image projected onto the measurement target W is large, a luminance in the boundary between the white color and the black color changes gradually. For this reason, the two peaks of the histogram overlap each other, and one peak is formed (it is not possible to discriminate between the two peaks). In the example illustrated in FIGS. 13A and 13B, a value V(10) of the dispersion calculated by the calculation unit 43 is $1.5 \times 10^{-1}$.

Figure 14A:
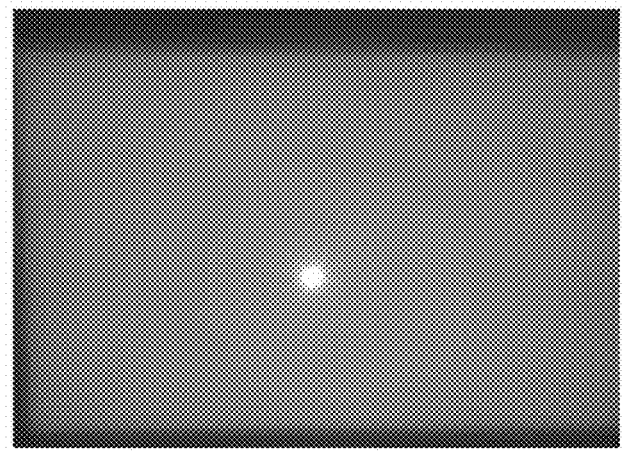
FIGS. 14A and 14B illustrate an example of a grid pattern captured image and an example of a histogram indicative of a dispersion for normalized luminances for the grid pattern captured image when a grid pattern image having a dot size of two pixels is projected onto the semitransparent acrylic measurement target.
Figure 14B:
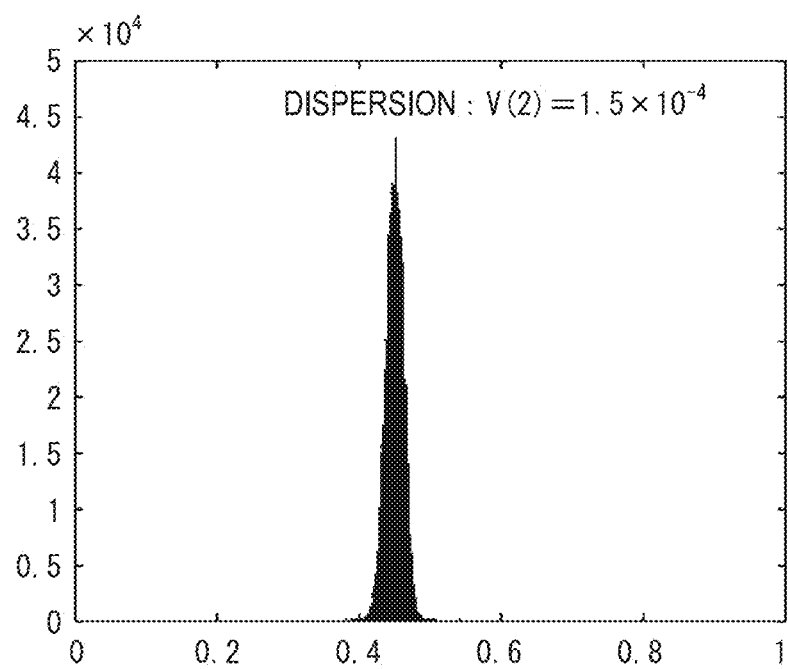

FIGS. 14A and 14B illustrate an example of a grid pattern captured image and an example of a histogram indicative of a dispersion for normalized luminances when a grid pattern image having a dot size of two pixels is projected onto the semitransparent acrylic measurement target W. FIG. 14A illustrates an example of the grid pattern captured image when the grid pattern image having a dot size of two pixels is projected onto the semitransparent acrylic measurement target W. FIG. 14B illustrates an example of the histogram indicative of the dispersion for the normalized luminances of the grid pattern captured image illustrated in FIG. 14A.

In the example illustrated in FIGS. 14A and 14B, the histogram indicative of the dispersion for the normalized luminances is a histogram having one peak as illustrated in FIG. 14B. In the example illustrated in FIGS. 14A and 14B, a value V(2) of the dispersion calculated by the calculation unit 43 is $1.5 \times 10^{-4}$, and it can be seen that the degree of bleeding is large and a value of the dispersion is small compared to the example illustrated in FIGS. 13A and 13B.

Figure 15A:
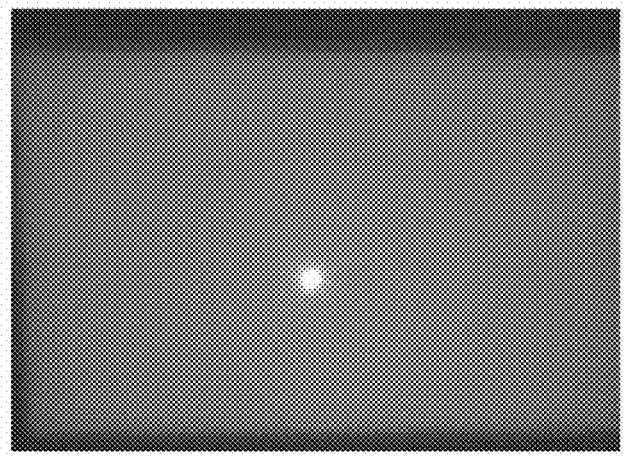
FIGS. 15A and 15B illustrate an example of a grid pattern captured image and an example of a histogram indicative of a dispersion for normalized luminances for the grid pattern captured image when a grid pattern image having a dot size of one pixel is projected onto the semitransparent acrylic measurement target.
Figure 15B:
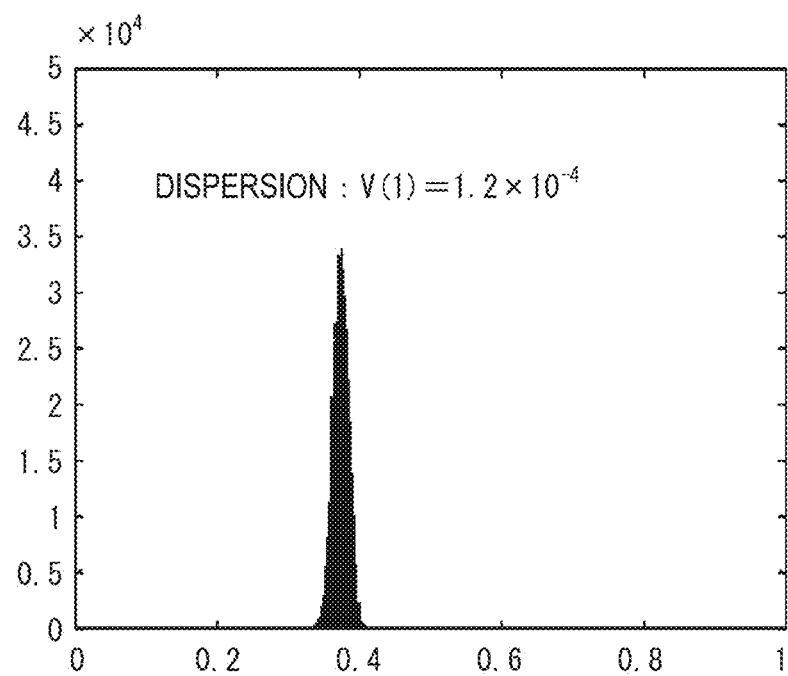

FIGS. 15A and 15B illustrate an example of a grid pattern captured image and an example of a histogram indicative of a dispersion for normalized luminances when a grid pattern image having a dot size of one pixel is projected onto the semitransparent acrylic measurement target W. FIG. 15A illustrates an example of the grid pattern captured image when the grid pattern image having a dot size of one pixel is projected onto the semitransparent acrylic measurement target W. FIG. 15B illustrates an example of the histogram indicative of the dispersion for the normalized luminances of the grid pattern captured image illustrated in FIG. 15A.

In the example illustrated in FIGS. 15A and 15B, the histogram indicative of the dispersion for the normalized luminances is a histogram having one peak similar to the example illustrated in FIG. 14B. In the example illustrated in FIGS. 15A and 15B, a value V(1) of the dispersion calculated by the calculation unit 43 is $1.2 \times 10^{-4}$, and it can be seen that the degree of bleeding further increases and a value of the dispersion further decreases compared to the example illustrated in FIGS. 14A and 14B. From the comparison of FIGS. 13A to 15B, it can be seen that the value of the dispersion for the normalized luminances tends to decrease to the extent that the degree of bleeding of the grid pattern image projected onto the measurement target W increases in the grid pattern captured image.

After the calculation unit 43 calculates the dispersion for all of the grid pattern captured images, the determination unit 45 determines whether the dispersion for each of the grid pattern captured images is a predetermined value or greater. The determination unit 45 extracts the grid pattern captured images, the dispersion for which being determined to be the predetermined value or greater (step S160). Subsequently, the selection unit 47 extracts a grid pattern captured image, which satisfies a predetermined condition (that is, a grid pattern captured image having the smallest dot size), from the grid pattern captured images extracted by the determination unit 45 in step S160. The selection unit 47 selects a dot size associated with the extracted grid pattern captured image (step S170).

Subsequently, the three-dimensional measurement unit 49 reads a random dot pattern image from the storage unit 32, the random dot pattern image having the dot size selected by the selection unit 47 in step S160. The three-dimensional measurement unit 49 measures the measurement target W three-dimensionally based on the read random dot pattern image, and generates a three-dimensional point cloud for the measurement target W (step S180).

More specifically, the projection control unit 41 controls the projection unit 20 to project the random dot pattern image read by the three-dimensional measurement unit 49 onto the measurement target W. The imaging control unit 42 controls the imaging unit 10 to capture a measurement image of the measurement target W onto which the random dot pattern image is projected. The image acquisition unit 35 acquires the measurement image from the imaging unit 10. The three-dimensional measurement unit 49 acquires the measurement image from the image acquisition unit 35, and generates a three-dimensional point cloud for the measurement target W using the stereo block matching method or the like based on the acquired measurement image.

Figure 16:
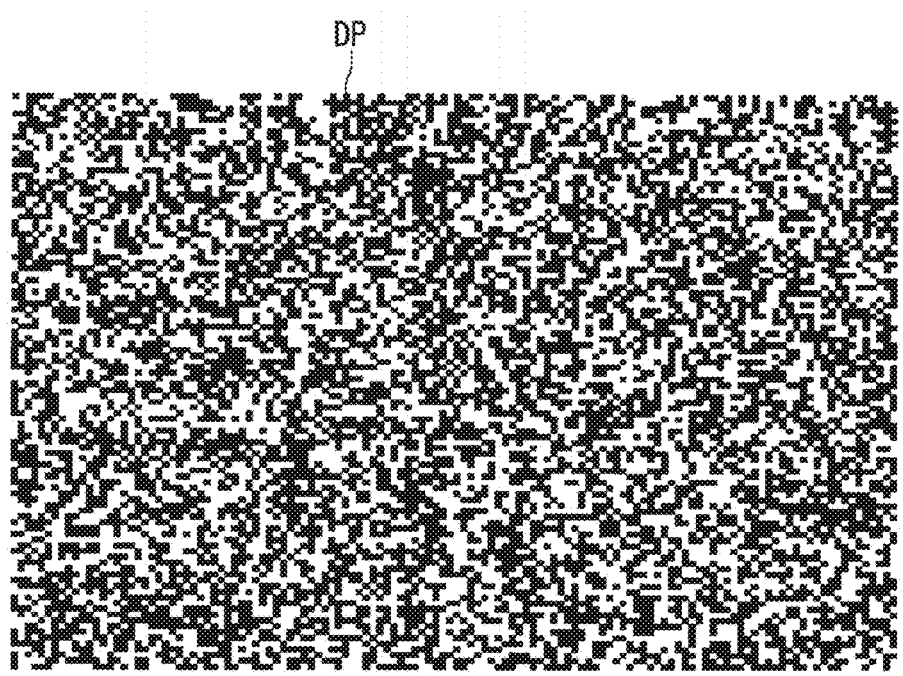
FIG. 16 is a view illustrating an example of a random dot pattern image.

Hereinafter, a random dot pattern image will be described with reference to FIG. 16. FIG. 16 is a view illustrating an example of a random dot pattern image DP. As illustrated in FIG. 16, the random dot pattern image is a pattern image in which white dots and black dots are randomly disposed using random numbers or the like. The accuracy in generating a three-dimensional point cloud based on a three-dimensional measurement changes depending on the degree of bleeding when a pattern having randomly disposed dots is projected onto the measurement target W, and it is possible to generate a highly accurate three-dimensional point cloud to the extent that the degree of bleeding decreases as described above.

Figure 17A:
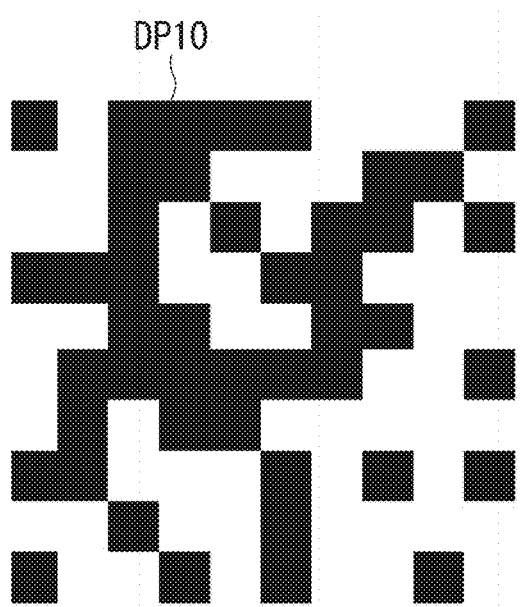
FIGS. 17A and 17B illustrate an example of a random dot pattern image having a dot size of ten pixels, and part of a measurement image that captures a range inclusive of the measurement target onto which the random dot pattern image is projected.
Figure 17B:
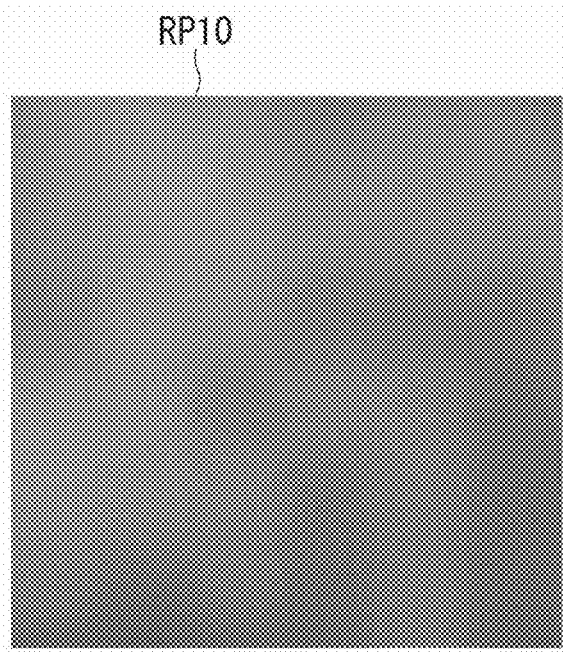
Figure 18A:
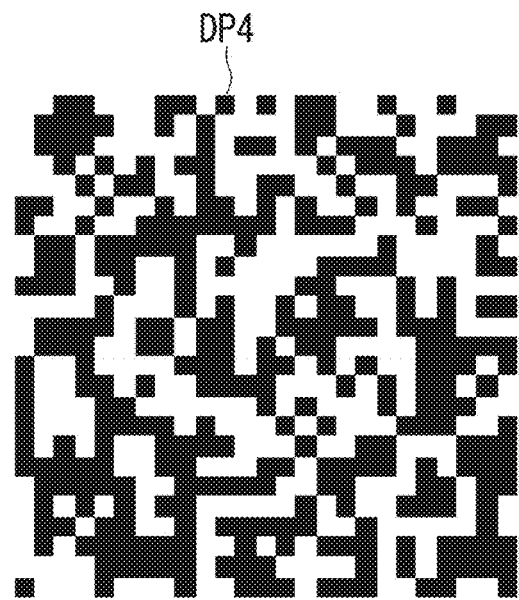
FIGS. 18A and 18B illustrate an example of a random dot pattern image having a dot size of four pixels, and part of a measurement image that captures a range inclusive of the measurement target onto which the random dot pattern image is projected.
Figure 18B:
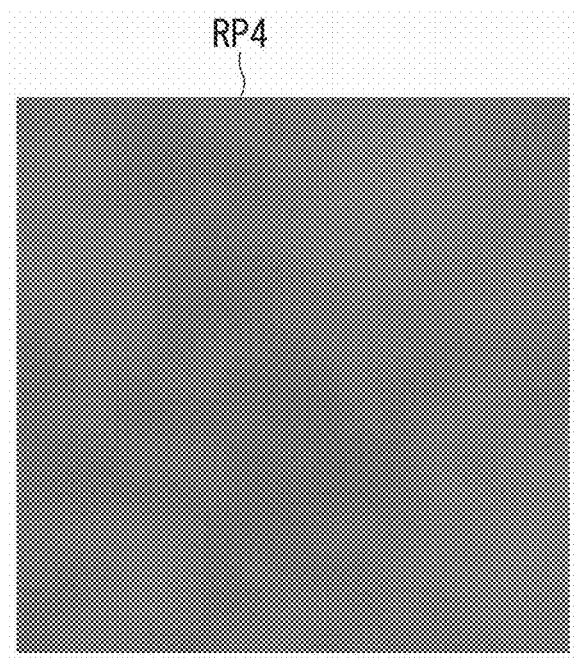
Figure 19A:
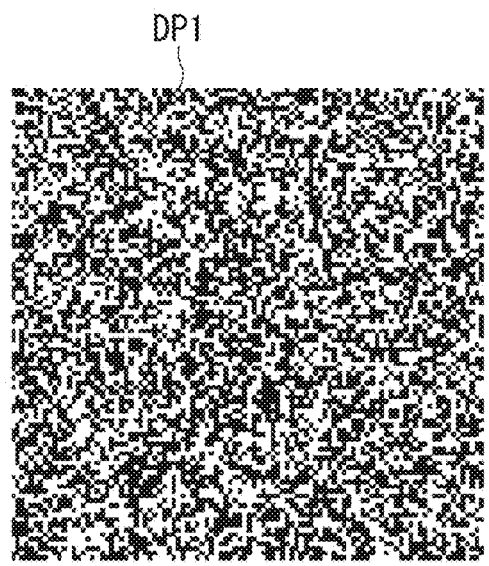
FIGS. 19A and 19B illustrate an example of a random dot pattern image having a dot size of one pixel, and part of a measurement image that captures a range inclusive of the measurement target onto which the random dot pattern image is projected.
Figure 19B:
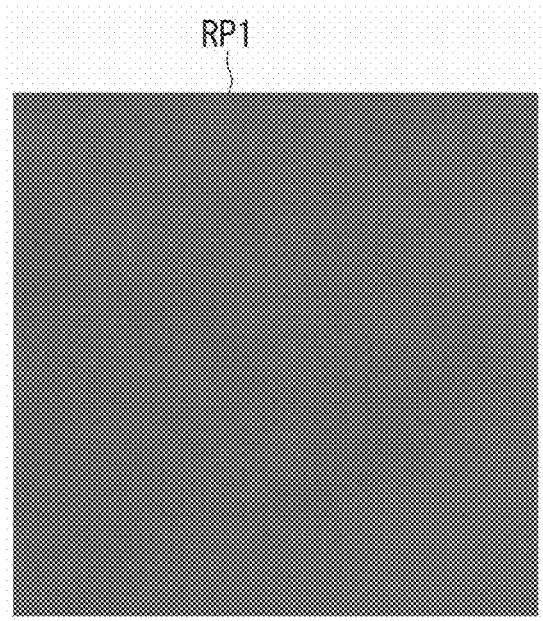

The bleeding of dots when a random dot pattern image is projected onto the measurement target W will be described from the comparison of FIGS. 17A to 19B. FIGS. 17A and 17B illustrate an example of a random dot pattern image DP10 having a dot size of ten pixels, and part of a measurement image RP10 that captures a range inclusive of the measurement target W onto which the random dot pattern image DP10 is projected. FIGS. 18A and 18B illustrate an example of a random dot pattern image DP4 having a dot size of four pixels, and illustrate a part of a measurement image RP4 that captures a range inclusive of the measurement target W onto which the random dot pattern image DP4 is projected. FIGS. 19A and 19B illustrate an example of a random dot pattern image DP1 having a dot size of one pixel, and part of a measurement image RP1 that captures a range inclusive of the measurement target W onto which the random dot pattern image DP1 is projected.

From the comparison of FIGS. 17B to 19B, dots in measurement images illustrated in FIGS. 17B and 18B bleed; however, it is possible to detect the boundary between the white color and the black color with the naked eye, and in contrast, it is difficult to detect the boundary between a white dot and a black dot in a measurement image illustrated in FIG. 19B with the naked eye. In a case where a three-dimensional measurement is performed based on pattern matching, for example, using the stereo block matching method, when it is easy to detect the feature point (in this example, the boundary between the white dot and the black dot) of the measurement target W, the accuracy of the three-dimensional measurement increases to some extent. That is, when it is difficult to detect the boundary between the white color and the black color with the naked eye as illustrated in FIG. 19B, the accuracy of the three-dimensional measurement decreases considerably.

As described with reference to FIGS. 1 to 15B, the control system 1 selects a random dot pattern image having a dot size suitable for the material or the shape of the measurement target W, based on a grid pattern captured image obtained by the imaging unit 10. Accordingly, the control system 1 can easily measure the three dimensions of the measurement target W highly accurately for a short amount of time, based on the random dot pattern image suitable for the material or the shape of the measurement target W. For example, the control system 1 may include a robot system. In this case, the robot system (or a robot) controls a robot to perform predetermined work on the measurement target W via visual servoing, based on the three-dimensional point cloud for the measurement target W generated by the control system 1.

Figure 20:
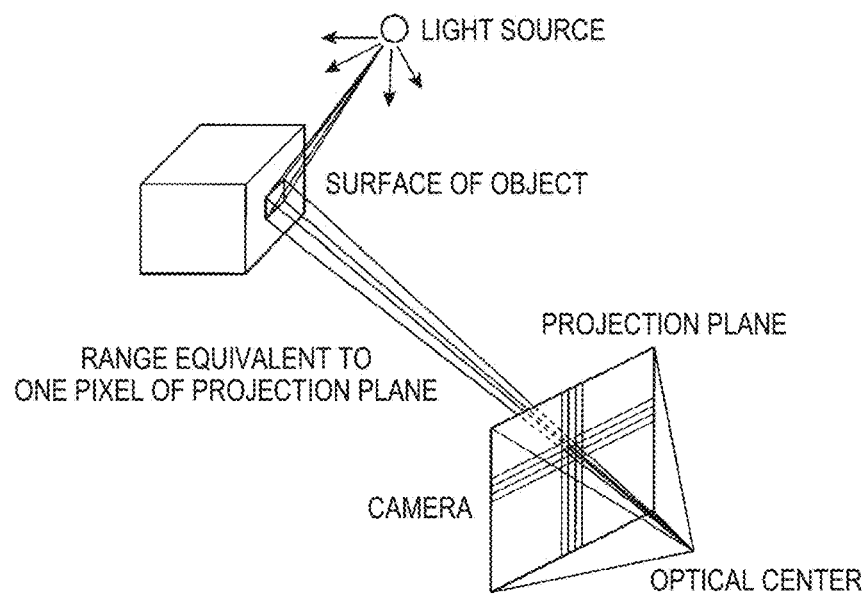
FIG. 20 is a view illustrating an example in which light from a light source is reflected from the surface of an object, and reflected light is projected onto a projection plane (that is, an imaging element) of a camera.
Figure 21:
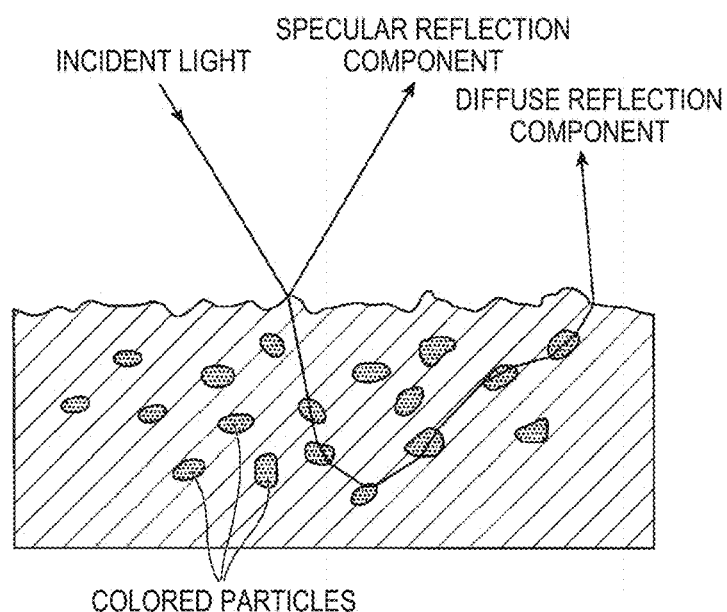
FIG. 21 is a view illustrating an example in which light from a light source is reflected from the interior of an object.

The following description given with reference to FIGS. 20 and 21 is regarding the reason why the degree of bleeding changes depending on the material or the shape of the measurement target W. FIG. 20 is a view illustrating an example in which light from a light source is reflected from the surface of an object, and reflected light is projected onto a projection plane (that is, an imaging element) of a camera. FIG. 21 is a view illustrating an example in which light from a light source is reflected from the interior of an object. When light reflected from one point on the surface of the object reaches a range equivalent to one pixel of the projection plane of the camera, bleeding (that is, blurring) does not occur in an image projected onto the projection plane of the camera. However, typically, light reflected from a plurality of points on the surface of the object reaches the range equivalent to one pixel of the projection plane of the camera. At this time, due to the light reflected from the plurality of points, bleeding occurs in an image projected onto the projection plane of the camera. In other words, the degree of dot bleeding changes due to the concavities and convexities of the surface (that is, the shape) of the object.

Light projected onto an object is not necessarily reflected from the surface of the object. As illustrated in FIG. 21, part of the light projected onto the object passes to the interior of the object, and is reflected from colored particles or the like in the object. As such, the reflected light of the light projected onto the object diffuses due to a component of the light reflected from the interior of the object, and bleeding (blurring) occurs when the reflected light is projected onto the projection plane of the camera.

Accordingly, in order to improve the accuracy of a three-dimensional measurement, it is necessary to select a random dot pattern image having a dot size suitable for the material or the shape of the measurement target W. Since the control system 1 selects a random dot pattern image having a dot size suitable for the material or the shape of the measurement target W, it is possible to easily realize a highly accurate three-dimensional measurement, and as a result, it is possible to improve the accuracy of various processes performed using the three-dimensional measurement.

Modification Example 1 of Embodiment

Hereinafter, Modification Example 1 of the embodiment of the invention will be described with reference to the drawings. The control system 1 according to Modification Example 1 of the embodiment is configured to divide the region of the measurement target W in a grid pattern captured image into a plurality of regions (hereinafter, referred to as windows), to calculate a dispersion for luminances for each of the divided windows, and to select a random dot pattern image having a dot size suitable for each of the windows based on the calculated dispersion, instead of being configured to calculate normalized luminances for all of pixels in the region of the measurement target W in a grid pattern captured image, and to calculate a dispersion for the luminances in the region based on the calculated luminances.

Figure 22:
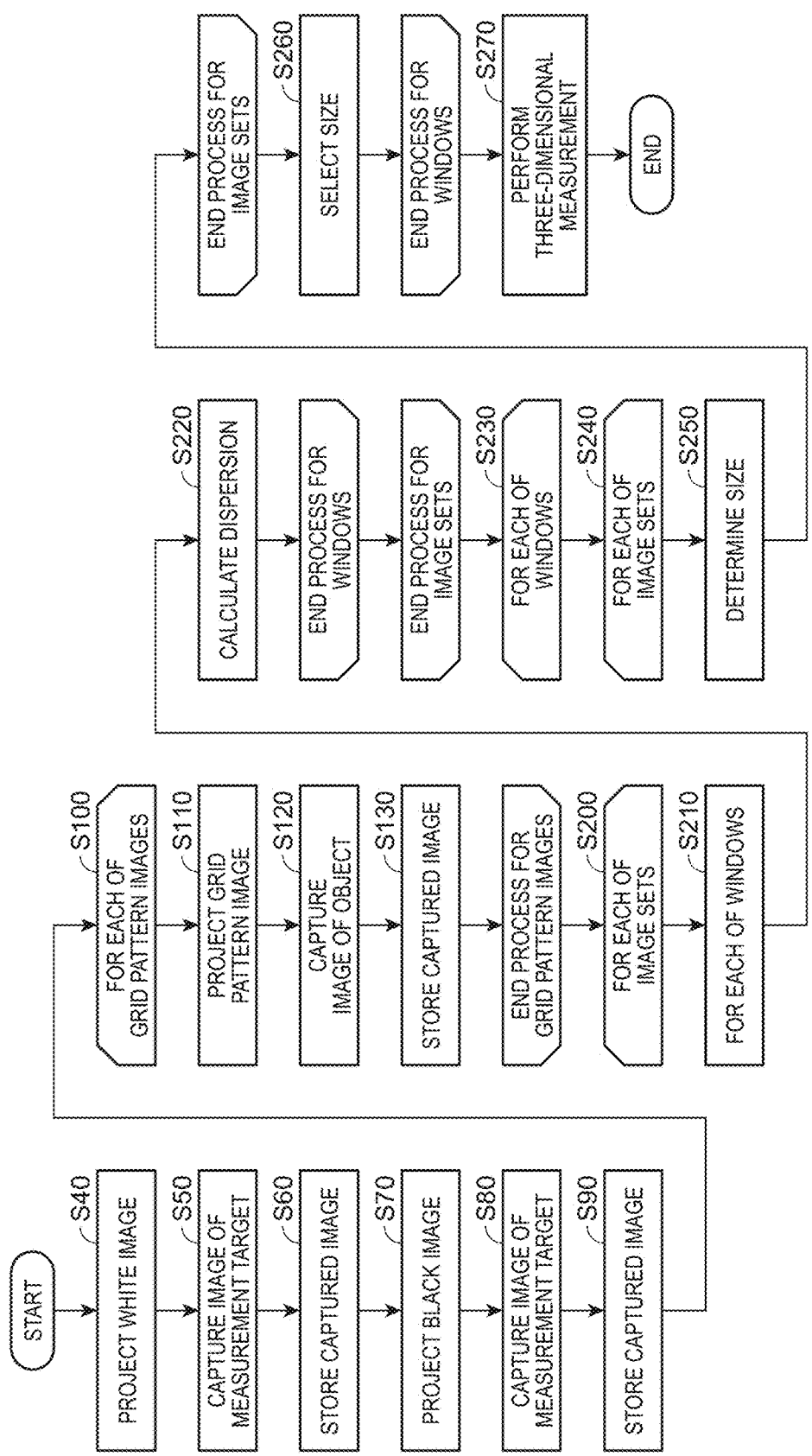
FIG. 22 is a flowchart illustrating an example of the flow of the pattern image selection process performed by the control apparatus according to Modification Example 1 of the embodiment.

Hereinafter, the pattern image selection process performed by the control apparatus 30 according to Modification Example 1 of the embodiment will be described with reference to FIG. 22. FIG. 22 is a flowchart illustrating an example of the flow of the pattern image selection process performed by the control apparatus 30 according to Modification Example 1 of the embodiment. Since steps S40 to S130 are the same as those performed by the control apparatus 30 according to the embodiment illustrated in FIG. 9, the same reference signs are assigned thereto, and a description thereof will be omitted.

In steps S100 to S130, after captured image sets for all of grid pattern images are stored in the storage unit 32, the calculation unit 43 reads a white captured image and a black captured image from the storage unit 32. The calculation unit 43 reads the captured image sets that are stored in the storage unit 32 by the image acquisition unit 35, selects the read captured image sets one by one in order, and repeats steps S210 to S240 for a grid pattern captured image associated with the selected captured image set (step S200).

After the captured image set is selected in step S200, the calculation unit 43 detects the region of the measurement target W in the grid pattern image associated with the selected captured image set using pattern matching, edge detection, or the like. The calculation unit 43 divides the region of the measurement target W in the grid pattern captured image into a plurality of regions (hereinafter, referred to as windows), and repeats step S220 for each of the divided windows (step S210).

Figure 23:
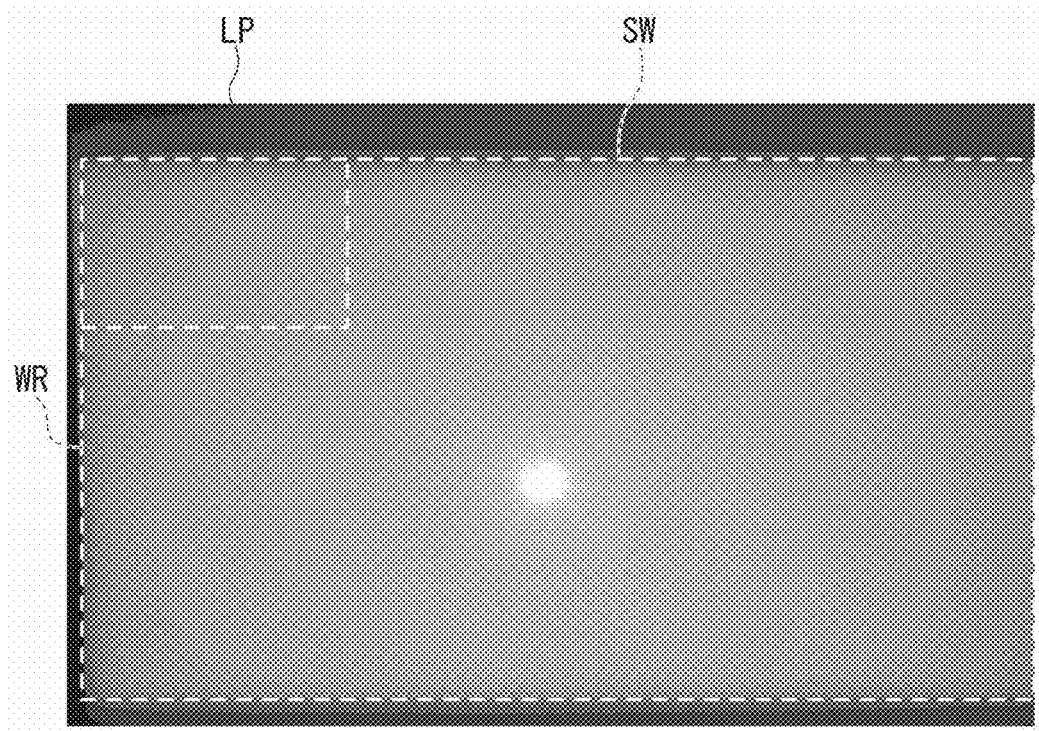
FIG. 23 illustrates an example of the window that is set by dividing the region of the measurement target in the grid pattern captured image into a plurality of regions.

The following description given with reference to FIG. 23 is regarding windows that are set by dividing the region of the measurement target W in a grid pattern captured image into a plurality of regions. FIG. 23 illustrates an example of the window that is set by dividing the region of the measurement target W in the grid pattern captured image into the plurality of regions. As illustrated in FIG. 23, the calculation unit 43 divides the region WR of the measurement target W in the grid pattern captured image LP into the plurality of regions, and the divided regions are set as a window SW.

For example, the calculation unit 43 divides the region WR of the measurement target W for all of the grid pattern captured images in the same manner, and associates the windows with window IDs for the identification of the windows, respectively. As a result, the control unit 36 can compare the windows set at the same position in the region of the measurement target W in the grid pattern captured images with the associated different dot sizes, based on the window ID.

After the window is selected in step S210, the calculation unit 43 calculates normalized luminances for all of pixels in the selected window using Expression (1). The calculation unit 43 calculates a dispersion for normalized luminances in the window, based on the calculated normalized luminances (step S220). The plurality of window regions may overlap each other, and may not overlap each other. In the embodiment, a description will be given on the condition that adjacent windows overlap each other while being shifted by one pixel in an adjacent direction (for example, each of an x-axis direction and a y-axis direction).

Subsequently, the determination unit 45 and the selection unit 47 select the windows one by one, which are set for all of the grid pattern captured images by the calculation unit 43 in step S200 and are identified by the window IDs, and repeat steps S240 to S260 for each of the selected windows (step S230). Subsequently, the determination unit 45 reads all of the image sets from the storage unit 32, selects the read image sets one by one, and repeats step S250 for the window which is in the grid pattern captured image associated with the selected image set and is selected in step S230 (step S240).

The determination unit 45 determines whether a dispersion for a distribution of the normalized luminances in the window is a predetermined value or greater, the window being on the grid pattern captured image associated with the image set selected in step S240 and being selected in step S230. The determination unit 45 extracts grid pattern captured images, the dispersions for which being determined to be the predetermined value or greater (step S250).

Subsequently, from the grid pattern captured images (the grid pattern captured images whose dispersions are the predetermined value or greater) extracted in step S250, the selection unit 47 extracts a grid pattern captured image having the smallest dot size associated with the grid pattern captured image for the window selected in step S230. The selection unit 47 selects a dot size associated with the extracted grid pattern captured image, and associates information indicative of a random dot pattern image having the selected dot size with a window ID indicative of the window selected in step S230 (step S260).

After all of the windows are associated with information indicative of the random dot pattern image having the dot size selected in step S260, via the projection control unit 41, the three-dimensional measurement unit 49 controls the projection unit 20 to project the random dot pattern image associated with each of the windows onto the measurement target W. Via the imaging control unit 42, the three-dimensional measurement unit 49 controls the imaging unit 10 to capture an image of a range inclusive of the measurement target W onto which the random dot pattern image is projected. The three-dimensional measurement unit 49 measures the measurement target W three-dimensionally, based on the captured image obtained by the imaging unit 10, and generates a three-dimensional point cloud for the measurement target W.

Modification Example 2 of Embodiment

Hereinafter, Modification Example 2 of the embodiment of the invention will be described with reference to the drawings. In step S250 in the flowchart illustrated in FIG. 22, the control unit 36 of the control system 1 according to Modification Example 2 of the embodiment calculates a dispersion for a distribution of the normalized luminances calculated for all of the windows in the grid pattern captured image associated with the image set selected in step S240. The determination unit 45 selects a dot size of the random dot pattern image, based on the dispersion for the distribution.

Figure 24:
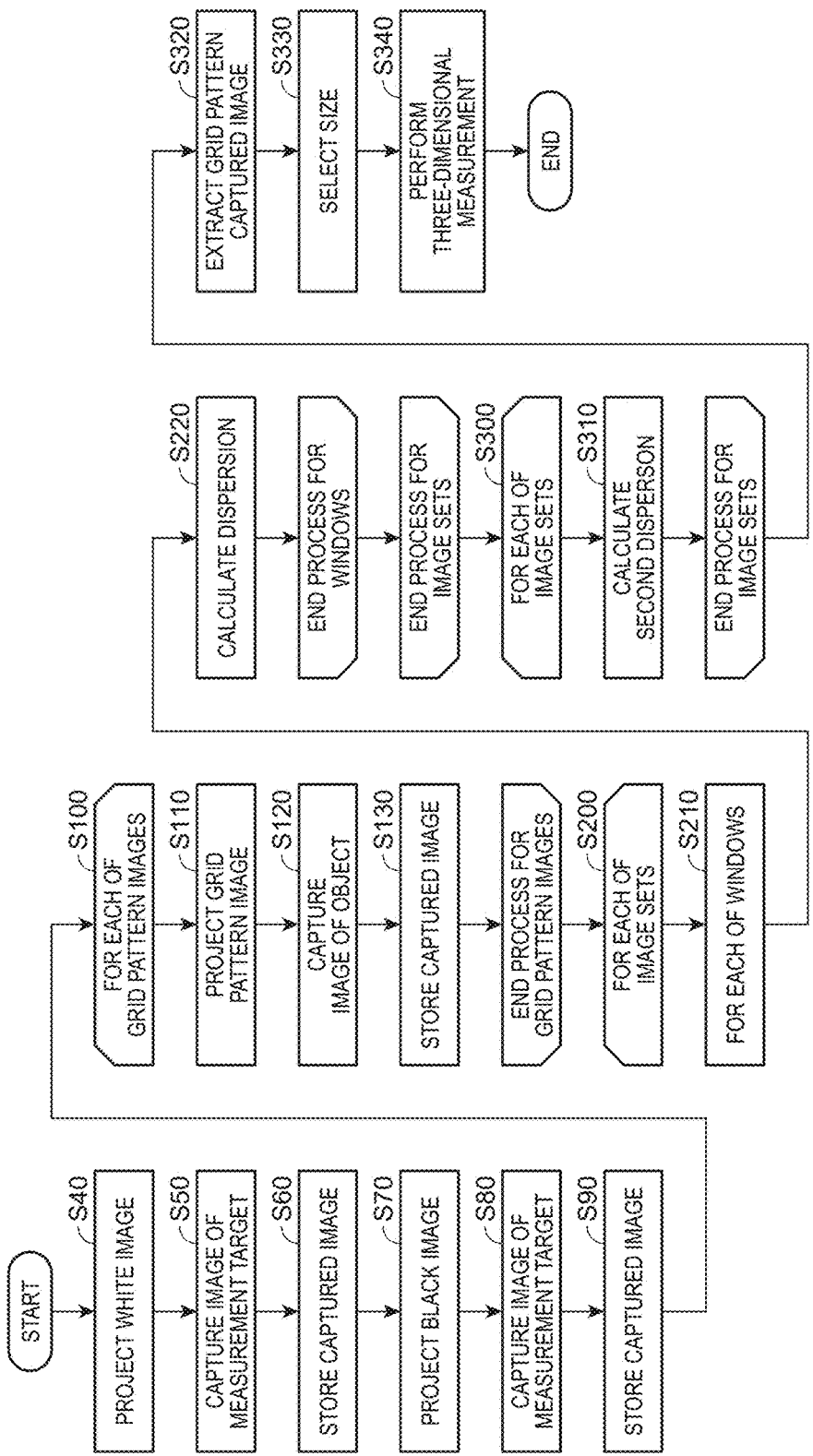
FIG. 24 is a flowchart illustrating an example of the flow of the pattern image selection process performed by the control apparatus according to Modification Example 2 of the embodiment.

Hereinafter, the pattern image selection process performed by the control apparatus 30 according to Modification Example 2 of the embodiment will be described with reference to FIG. 24. FIG. 24 is a flowchart illustrating an example of the flow of the pattern image selection process performed by the control apparatus 30 according to Modification Example 2 of the embodiment. Since steps S40 to S130 are the same as those performed by the control apparatus 30 according to Modification Example 1 of the embodiment illustrated in FIG. 9, the same reference signs are assigned thereto, and a description thereof will be omitted. Since steps S200 to S220 are the same as those performed by the control apparatus 30 according to Modification Example 1 of the embodiment illustrated in FIG. 22, the same reference signs are assigned thereto, and a description thereof will be omitted.

After the repetition of step S220 is completed, the calculation unit 43 selects the captured image sets one by one which are read in step S200, and repeats step S310 for each of the selected captured image sets (step S300). The calculation unit 43 calculates a dispersion for a distribution in the region of the measurement target W as a second dispersion, based on the dispersion for a distribution of the normalized luminances for the windows in the grid pattern captured image associated with the captured image set selected in step S300 (step S310).

Figure 25:
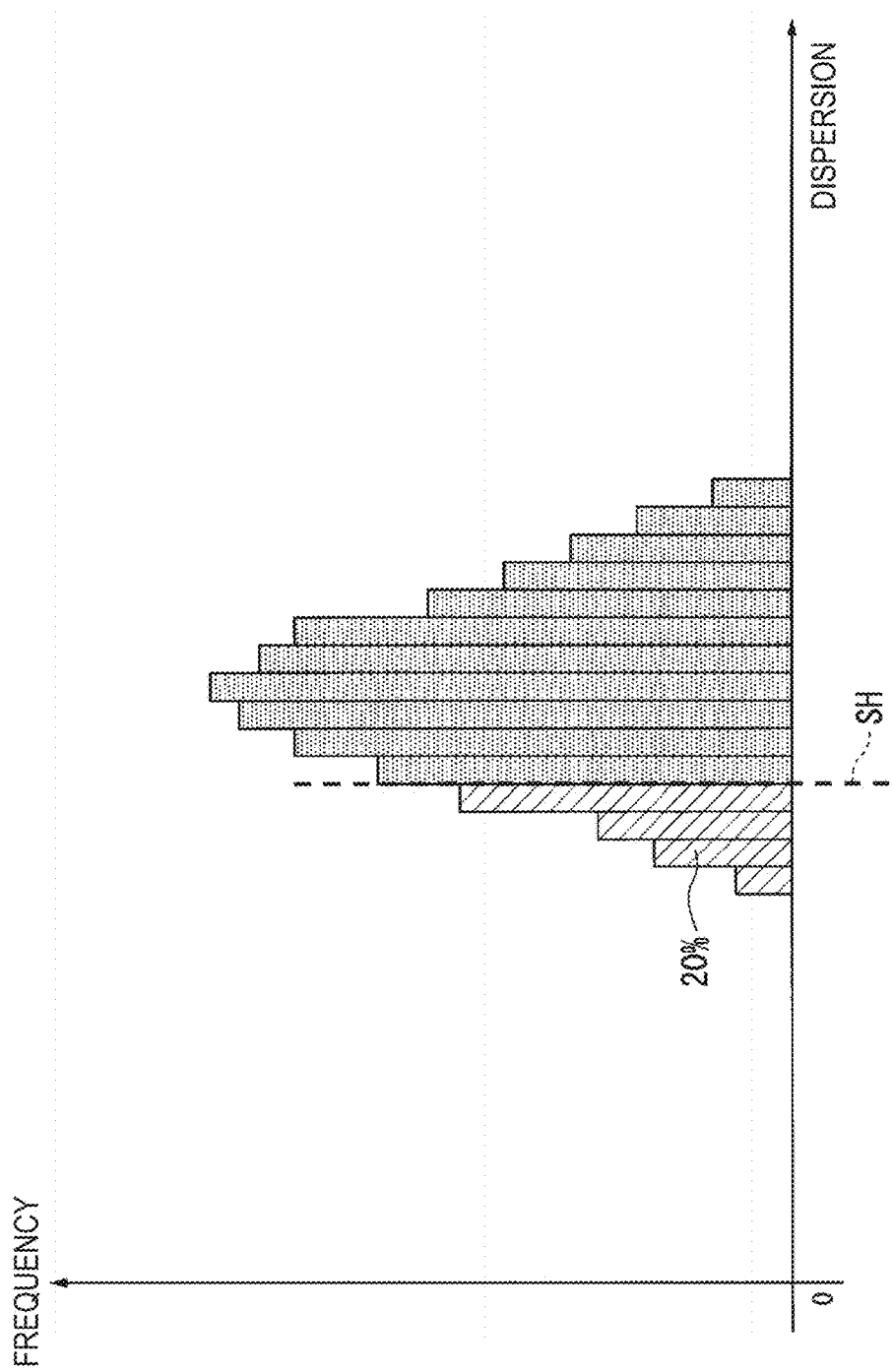
FIG. 25 illustrates an example of a histogram indicative of a second dispersion.

Hereinafter, a process of calculating the second dispersion will be described with reference to FIG. 25. FIG. 25 illustrates an example of a histogram indicative of the second dispersion. In FIG. 25, the horizontal axis of the histogram indicates a dispersion, and the vertical axis indicates the frequency of the dispersion. That is, the histogram illustrated in FIG. 25 illustrates a frequency indicative of how often a value of a dispersion for each window appears in a grid pattern captured image which is a target. The calculation unit 43 calculates the second dispersion illustrated by the histogram in FIG. 25.

After the second dispersion for each of the grid pattern captured images for all of the captured image sets is calculated, the determination unit 45 determines whether the grid pattern captured images satisfy a predetermined condition, and extracts grid pattern captured images which satisfy a predetermined second condition, based on a determination result (step S320). For example, the predetermined second condition implies that a ratio of windows having a dispersion less than a predetermined threshold value (for example, a threshold value SH in FIG. 25) to all of the windows is a predetermined ratio or less in a histogram (for example, the histogram illustrated in FIG. 25) which illustrates the second dispersion for a grid pattern captured image. For example, the predetermined ratio is 20%; however, instead of that, the predetermined ratio may be less than 20%, or may be a value exceeding 20%.

Subsequently, the selection unit 47 extracts a grid pattern captured image having the smallest associated dot size from the grid pattern captured images extracted by the determination unit 45 in step S320. The selection unit 47 selects a dot size associated with the extracted grid pattern captured image (step S330).

Subsequently, the three-dimensional measurement unit 49 reads a random dot pattern image from the storage unit 32, the random dot pattern image having the dot size selected by the selection unit 47 in step S330. The three-dimensional measurement unit 49 measures the measurement target W three-dimensionally, based on the read random dot pattern image, and generates a three-dimensional point cloud for the measurement target W (step S340).

In the embodiment, when a first measurement target and a second measurement target are respectively captured in the first captured image and the second captured image (that is, there are two measurement targets), the control system 1 may be configured to select a random dot pattern image suitable for the material or the shape of the first measurement target for the region of the first measurement target in the captured image, to select a random dot pattern image suitable for the material or the shape of the second measurement target for the region of the second measurement target in the captured image, and to be capable of simultaneously measuring both the first measurement target and the second measurement target three-dimensionally.

In addition, the control system 1 may be configured to change an imaging angle (the angle of an optical axis) of the first imaging unit 11 and the second imaging unit 12 with respect to the measurement target W, to obtain a grid pattern captured image for each of the imaging angles, and to select a random dot pattern image suitable for the material or the shape of the measurement target W based on the obtained grid pattern captured image for each of the imaging angles. In this case, the control system 1 includes a member configured to change the imaging angle of the first imaging unit 11 and the second imaging unit 12. Accordingly, the control system 1 can select an imaging angle to maximize a dispersion and to minimize a dot size, and as a result, it is possible to improve the accuracy of a three-dimensional measurement.

In addition, when the control system 1 repeatedly measures the three dimensions of a plurality of the measurement targets W that are disposed at the same position in an imaging range of the first imaging unit 11 and the second imaging unit 12 and have the same material or shape, the control system 1 may be configured to repeatedly use a random dot pattern image initially selected via the pattern image selection process for a three-dimensional measurement, or may be configured to perform the pattern image selection process whenever the measurement target W is changed.

The control system 1 may be configured to perform a three-dimensional measurement based on a grid pattern image having a selected dot size, instead of being configured to perform a three-dimensional measurement based on a random dot pattern image having a selected dot size.

As described above, the control system 1 according to the embodiment projects a plurality of grid pattern images having different dot sizes onto the measurement target W, selects a single grid pattern image from the plurality of grid pattern images, and projects a random dot pattern image having the dot size of the selected grid pattern image onto the measurement target W. Accordingly, the control system 1 can perform a three-dimensional measurement suitable for the material or the shape of the measurement target W.

The control system 1 calculates a statistic for each grid pattern image, based on a plurality of grid pattern captured images that capture the measurement target W onto which a plurality of the grid pattern images having different dot sizes are projected, and selects a single grid pattern image based on the calculated statistic for each of the grid pattern images. Accordingly, the control system 1 can select a second pattern suitable for the material or the shape of the measurement target W, based on a dot size of the single grid pattern image selected based on the statistic for each of the grid pattern images, and can measure the three dimensions of the measurement target based on the second pattern.

The control system 1 calculates a statistic for the entire region indicative of the measurement target W in a plurality of grid pattern captured images that capture the measurement target W onto which a plurality of the grid pattern images having different dot sizes are projected. Accordingly, the control system 1 can perform a three-dimensional measurement suitable for the material or the shape of the entire measurement target W.

The control system 1 divides a region indicative of the measurement target W in a plurality of grid pattern captured images into a plurality of regions, the grid pattern captured images capturing the measurement target W onto which a plurality of grid pattern images having different dot sizes are projected, calculates a statistic for each of the divided regions, and selects a single grid pattern image while considering the calculated statistic for each of the divided regions as the statistic for each of the grid pattern images. Accordingly, the control system 1 can perform a three-dimensional measurement suitable for the material or the shape of the entire measurement target W, based on the calculated statistic for each partial region on the measurement target W.

The control system 1 divides a region indicative of the measurement target W in a plurality of grid pattern captured images into a plurality of regions, the plurality of grid pattern captured images capturing the measurement target W onto which the plurality of grid pattern images having different dot sizes is projected, calculates a statistic for each of the divided regions, and selects a single grid pattern image based on the calculated statistic for each of the divided regions. Accordingly, the control system 1 can perform a three-dimensional measurement suitable for the material or the shape of each partial region on the measurement target W.

The control system 1 selects a single grid pattern image, which satisfies a predetermined condition, from grid pattern images whose statistics are a predetermined value or greater. Accordingly, the control system 1 can perform a three-dimensional measurement suitable for the material or the shape of the measurement target W, based on the grid pattern image which satisfies the predetermined condition and is selected from the grid pattern images whose statistics are the predetermined value or greater.

The control system 1 selects a single grid pattern image having the smallest dot size from grid pattern images whose statistics are a predetermined value or greater. Accordingly, the control system 1 can perform a high-resolution three-dimensional measurement.

The control system 1 projects a plurality of white and black grid pattern images having different dot sizes onto the measurement target W, selects a single grid pattern image from the plurality of grid pattern images, and projects a random dot pattern image having the dot size of the single selected grid pattern image onto the measurement target W. Accordingly, the control system 1 can perform a three-dimensional measurement using the random dot pattern image suitable for the material or the shape of the measurement target W based on the white and black grid pattern images.

The control system 1 projects a plurality of grid pattern images having different dot sizes onto the measurement target W, selects a single grid pattern image from the plurality of grid pattern images, and projects a grid pattern image having the dot size of the single selected grid pattern image, or a random dot pattern image having the dot size of the single selected grid pattern image onto the measurement target W. Accordingly, the control system 1 can perform a three-dimensional measurement based on the grid pattern image having the dot size of the single selected grid pattern, or the random dot pattern image having the dot size of the single selected grid pattern image.

The embodiment of the invention has been described in detail with reference to the accompanying drawings; however, a specific configuration of the invention is not limited to that in the embodiment, and modifications, replacements, removals, or the like may be made to the invention insofar as the modifications, the replacements, the removals, or the like does not depart from the spirit of the invention.

A program to realize the function of an arbitrary configuration unit of the above-mentioned apparatus (for example, the control apparatus 30 of the control system 1) may be recorded in a computer readable recording medium, and a computer system may read and perform the read program. Here, the "computer system" includes an operating system (OS), or hardware of peripheral devices. The "computer readable recording medium" implies a portable medium such as a flexible disk, a magneto-optical disk, a read only memory (ROM), or a compact disk (CD)-ROM, or a storage device such as a hard disk built into the computer system. In addition, the "computer readable recording medium" includes a built-in non-volatile memory for the computer system (a server or a client), for example, a random access memory (RAM) that holds the program for a predetermined amount of time when the program is transmitted to the non-volatile memory via a communication line such as a network (for example, the internet) or a telephone line.

The computer system configured to store the program in the storage device may transmit the program to another computer system via a transmission medium or transmission waves of the transmission medium. Here, the "transmission medium" configured to transmit the program implies a medium having an information transmission function, for example, a communication line such as a network (communication network) like the internet or a telephone line.

The program may realize only part of the functions. In addition, the program may be a so-called differential file (a differential program) that can realize the functions by being combined with a program already stored in the computer system.

The entire disclosure of Japanese Patent Application No. 2014-107053, filed May 23, 2014 is expressly incorporated by reference herein.

What is claimed is:

1. A control apparatus comprising:
a projector configured to project a plurality of first patterns and then a second pattern onto an object, the plurality of first patterns having different resolutions from each other;
a memory configured to store computer-readable instructions;
a camera configured to capture a plurality of images of the object on which the plurality of first patterns and the second pattern are respectively projected; and
a processor configured to execute the computer-readable instructions so as to:
calculate a statistic value corresponding to dispersion for a luminance distribution of the plurality of captured images of the object on which each of the plurality of first patterns is projected;
select a single first pattern from the plurality of first patterns based on the statistic value of each of the plurality of first patterns, the single first pattern having a smallest dot size among the plurality of first patterns;
determine a first resolution of the single first pattern; and
cause the projector to project the second pattern onto the object, the second pattern having the first resolution,
wherein the camera is configured to capture a second pattern image of the object on which the second pattern is projected, and
the processor is configured to measure three dimensions of the object based on the captured second pattern image.

2. The control apparatus according to claim 1,
wherein the processor is configured to calculate the statistic value for each of the plurality of first patterns based on the plurality of captured images of the object onto which each of the plurality of first patterns is projected.

3. The control apparatus according to claim 2, wherein the processor is configured to calculate the statistic value for an entire region indicative of the object in each of the plurality of captured images.

4. The control apparatus according to claim 2, wherein the processor is configured to divide a region indicative of the object in each of the plurality of captured images into a plurality of regions, and the processor is configured to calculate the statistic value for each of the plurality of divided regions, and wherein the processor is configured to select the single first pattern while considering the statistic value for each of the plurality of divided regions as the statistic value for each of the plurality of first patterns.

5. The control apparatus according to claim 2, wherein the processor is configured to divide a region indicative of the object in each of the plurality of captured images into a plurality of regions, and the processor is configured to calculate the statistic value for each of the plurality of divided regions, and wherein the processor is configured to select the single first pattern for each of the plurality of divided regions based on the statistic value for each of the plurality of divided regions.

6. The control apparatus according to claim 2, wherein each of the plurality of first patterns is a grid pattern depicted by a first color and a second color different from the first color, and wherein the processor is configured to calculate the statistic value corresponding to dispersion for a luminance distribution of the first color and the second color.

7. The control apparatus according to claim 6, wherein one of the first color and the second color is a white color, and the other is a black color.

8. The control apparatus according to claim 7, wherein the second pattern is one of the plurality of first patterns, or one of patterns different from the plurality of first patterns.

9. A robot comprising:
a projector configured to project a plurality of first patterns and a second pattern onto an object, the plurality of first patterns having different resolutions from each other;
a memory configured to store computer-readable instructions;
a camera configured to capture a plurality of images of the object on which the plurality of first patterns and the second pattern are respectively projected; and
a processor configured to execute the computer-readable instructions so as to:
calculate a statistic value corresponding to dispersion for a luminance distribution of the plurality of captured images of the object on which each of the plurality of first patterns is projected;
select a single first pattern from the plurality of the first patterns based on the statistic value of each of the plurality of first patterns, the single first pattern having a smallest dot size among the plurality of first patterns;
determine a first resolution of the single first pattern; and
cause the projector to project the second pattern onto the object, the second pattern having the first resolution, wherein the camera is configured to capture a second pattern image of the object on which the second pattern is projected, and the processor is configured to measure three dimensions of the object based on the captured second pattern image.

10. A control method for causing a processor to execute computer-readable instructions stored in a memory, the method comprising executing the computer-readable instructions on the processor the steps of:
projecting a plurality of first patterns having different resolutions and a second pattern onto an object;
obtaining a plurality of images of the object on which the plurality of first patterns and the second pattern are respectively projected;
calculating a statistic value corresponding to dispersion for a luminance distribution of the plurality of obtained images of the object on which each of the plurality of first patterns is projected;
selecting a single first pattern from the plurality of first patterns based on the statistic value of each of the plurality of first patterns, the single first pattern having a smallest dot size among the plurality of first patterns;
determining a first resolution of the single first pattern;
projecting the second pattern onto the object, the second pattern having the same resolution as the selected single first pattern; and
obtaining a second pattern image of the object on which the second pattern is projected, wherein the processor is configured to measure three dimensions of the object based on the obtained second pattern image.

* * * * *